(12) United States Patent
Popham

(10) Patent No.: US 8,262,752 B2
(45) Date of Patent: Sep. 11, 2012

(54) SYSTEMS AND METHODS FOR RELIABLE FEEDSTOCK DELIVERY AT VARIABLE DELIVERY RATES

(75) Inventor: Vernon Wade Popham, Bend, OR (US)

(73) Assignee: Idatech, LLC, Bend, OR (US)

( * ) Notice: Subject to any disclaimer, the term of this patent is extended or adjusted under 35 U.S.C. 154(b) by 935 days.

(21) Appl. No.: 12/255,063

(22) Filed: Oct. 21, 2008

(65) Prior Publication Data
US 2009/0155642 A1  Jun. 18, 2009

Related U.S. Application Data

(60) Provisional application No. 61/008,080, filed on Dec. 17, 2007.

(51) Int. Cl.
| B01J 7/00 | (2006.01) |
| B01J 10/00 | (2006.01) |
| C01B 3/36 | (2006.01) |
| C01B 6/24 | (2006.01) |
| C01B 3/24 | (2006.01) |

(52) U.S. Cl. ........... 48/61; 48/197 R; 423/644; 423/650; 422/625

(58) Field of Classification Search .......... 48/61, 197 R; 422/625–629; 423/644
See application file for complete search history.

(56) References Cited

U.S. PATENT DOCUMENTS

| 1,306,221 A | 6/1919 | Ellis |
| 1,782,824 A | 11/1930 | Hechenbleikner |
| 1,848,466 A | 3/1932 | Edmonds |
| 2,132,151 A | 10/1938 | Fenske et al. |
| 2,450,804 A | 10/1948 | Loy |
| 2,609,059 A | 9/1952 | Benedict |
| 2,824,620 A | 2/1958 | De Rosset |
| 3,094,391 A | 6/1963 | Mader |
| 3,144,312 A | 8/1964 | Mertens |
| 3,208,198 A | 9/1965 | Rubin |
| 3,336,730 A | 8/1967 | McBride et al. |
| 3,338,681 A | 8/1967 | Kordesch |
| 3,344,586 A | 10/1967 | Langley et al. |

(Continued)

FOREIGN PATENT DOCUMENTS

CA  1238866  7/1988

(Continued)

OTHER PUBLICATIONS

English-language abstract of Japanese Patent No. 57-145276, 1982.

(Continued)

*Primary Examiner* — Matthew Merkling
(74) *Attorney, Agent, or Firm* — Dascenzo Intellectual Property Law, P.C.

(57) ABSTRACT

Hydrogen-producing fuel processing assemblies and methods for delivering feedstock to a hydrogen-producing region of a hydrogen-producing fuel processing assembly. In some embodiments, the fuel processing assemblies include a feedstock delivery system that includes a pump assembly and a stall prevention mechanism that is adapted to reduce pressure in an outlet conduit during periods in which the pump assembly is not emitting a liquid outlet stream within or above a hydrogen-producing pressure range. In some embodiments, pressure in the outlet conduit is isolated from pressure in the hydrogen-producing region of the fuel processing assembly and is reduced during periods in which a liquid stream is not being pumped within or above a hydrogen-producing pressure range.

10 Claims, 5 Drawing Sheets

U.S. PATENT DOCUMENTS

| | | |
|---|---|---|
| 3,350,176 A | 10/1967 | Green et al. |
| 3,356,538 A | 12/1967 | Miekka et al. |
| 3,368,329 A | 2/1968 | Eguchi et al. |
| 3,428,476 A | 2/1969 | Langley et al. |
| 3,439,474 A | 4/1969 | McKinley |
| 3,447,288 A | 6/1969 | Juda et al. |
| 3,450,500 A | 6/1969 | Setzer et al. |
| 3,469,372 A | 9/1969 | Yamauchi et al. |
| 3,469,944 A | 9/1969 | Bocard et al. |
| 3,486,301 A | 12/1969 | Bonnet |
| 3,520,803 A | 7/1970 | Iaconelli |
| 3,522,019 A | 7/1970 | Buswell et al. |
| 3,524,819 A | 8/1970 | Guerrieri |
| 3,534,531 A | 10/1970 | Eguchi et al. |
| 3,564,819 A | 2/1971 | Neulander et al. |
| 3,589,171 A | 6/1971 | Haley |
| 3,655,448 A | 4/1972 | Setzer |
| 3,665,680 A | 5/1972 | Heuser |
| 3,713,270 A | 1/1973 | Farr et al. |
| 3,761,382 A | 9/1973 | Hammond et al. |
| 3,782,904 A | 1/1974 | Fletcher |
| 3,787,038 A | 1/1974 | Tesner et al. |
| 3,791,106 A | 2/1974 | Haley |
| 3,837,146 A | 9/1974 | Faure et al. |
| 3,839,110 A | 10/1974 | Shankoff |
| 3,849,076 A | 11/1974 | Gryaznov et al. |
| 3,881,891 A | 5/1975 | Goltsov et al. |
| 3,881,897 A | 5/1975 | Faure et al. |
| 3,920,416 A | 11/1975 | Houseman |
| 3,955,941 A | 5/1976 | Houseman et al. |
| 3,972,695 A | 8/1976 | Buckley et al. |
| 3,980,452 A | 9/1976 | Krumm et al. |
| 3,982,910 A | 9/1976 | Houseman et al. |
| 4,003,343 A | 1/1977 | Lee |
| 4,003,725 A | 1/1977 | Bunn, Jr. et al. |
| 4,056,373 A | 11/1977 | Rubin |
| 4,078,985 A | 3/1978 | Takeuchi |
| 4,084,934 A | 4/1978 | Kumazawa |
| 4,098,959 A | 7/1978 | Fanciullo |
| 4,098,960 A | 7/1978 | Gagnon |
| 4,127,393 A | 11/1978 | Timmins et al. |
| 4,132,668 A | 1/1979 | Gryaznov et al. |
| 4,134,739 A | 1/1979 | Gulden et al. |
| 4,175,165 A | 11/1979 | Adlhart |
| 4,197,152 A | 4/1980 | Palty et al. |
| 4,214,969 A | 7/1980 | Lawrance |
| 4,238,403 A | 12/1980 | Pinto |
| 4,243,536 A | 1/1981 | Prölss |
| 4,248,688 A | 2/1981 | Gartner et al. |
| 4,254,086 A | 3/1981 | Sanders |
| 4,302,177 A | 11/1981 | Fankhanel et al. |
| 4,313,013 A | 1/1982 | Harris |
| 4,315,893 A | 2/1982 | McCallister |
| 4,319,923 A | 3/1982 | Falanga et al. |
| 4,329,157 A | 5/1982 | Dobo et al. |
| 4,331,520 A | 5/1982 | Juda et al. |
| 4,349,613 A | 9/1982 | Winsel |
| 4,381,641 A | 5/1983 | Madgavkar et al. |
| 4,387,434 A | 6/1983 | Moncrief, Jr. et al. |
| 4,400,182 A | 8/1983 | Davies et al. |
| 4,417,905 A | 11/1983 | Banks et al. |
| 4,422,911 A | 12/1983 | Juda et al. |
| 4,430,304 A | 2/1984 | Spurrier et al. |
| 4,444,158 A | 4/1984 | Yoon |
| 4,466,253 A | 8/1984 | Jaster |
| 4,468,235 A | 8/1984 | Hill |
| 4,472,176 A | 9/1984 | Rubin |
| 4,473,622 A | 9/1984 | Chludzinski et al. |
| 4,483,690 A | 11/1984 | Marion et al. |
| 4,504,447 A | 3/1985 | Spurrier et al. |
| 4,533,607 A | 8/1985 | Sederquist |
| 4,553,981 A | 11/1985 | Fuderer |
| 4,567,857 A | 2/1986 | Houseman et al. |
| 4,589,891 A | 5/1986 | Iniotakis et al. |
| 4,613,436 A | 9/1986 | Wight et al. |
| 4,642,273 A | 2/1987 | Sasaki |
| 4,644,751 A | 2/1987 | Hsu |
| 4,650,814 A | 3/1987 | Keller |
| 4,654,063 A | 3/1987 | Auvil et al. |
| 4,655,797 A | 4/1987 | Iniotakis et al. |
| 4,657,828 A | 4/1987 | Tajima |
| 4,659,634 A | 4/1987 | Struthers |
| 4,670,359 A | 6/1987 | Beshty et al. |
| 4,684,581 A | 8/1987 | Struthers |
| 4,693,945 A | 9/1987 | Ohyauchi et al. |
| 4,699,637 A | 10/1987 | Iniotakis et al. |
| 4,713,234 A | 12/1987 | Weirich et al. |
| 4,751,151 A | 6/1988 | Healy et al. |
| 4,781,241 A | 11/1988 | Misage et al. |
| 4,788,004 A | 11/1988 | Pinto et al. |
| 4,810,485 A | 3/1989 | Marianowski et al. |
| 4,820,594 A | 4/1989 | Sugita et al. |
| 4,838,897 A | 6/1989 | Amano et al. |
| 4,849,187 A | 7/1989 | Uozu et al. |
| 4,865,624 A | 9/1989 | Okada |
| 4,880,040 A | 11/1989 | Pierson et al. |
| 4,904,455 A | 2/1990 | Karafian et al. |
| 4,904,548 A | 2/1990 | Tajima |
| 4,946,667 A | 8/1990 | Beshty |
| 4,981,676 A | 1/1991 | Minet et al. |
| 4,999,107 A | 3/1991 | Guerif |
| 5,030,661 A | 7/1991 | Lywood |
| 5,032,365 A | 7/1991 | Aono et al. |
| 5,126,045 A | 6/1992 | Kohlheb et al. |
| 5,139,541 A | 8/1992 | Edlund |
| 5,158,581 A | 10/1992 | Coplan |
| 5,205,841 A | 4/1993 | Vaiman |
| 5,210,059 A | 5/1993 | Matturo et al. |
| 5,215,729 A | 6/1993 | Buxbaum |
| 5,217,506 A | 6/1993 | Edlund et al. |
| 5,225,080 A | 7/1993 | Karbachsch et al. |
| 5,226,928 A | 7/1993 | Makabe et al. |
| 5,229,102 A | 7/1993 | Minet et al. |
| 5,259,870 A | 11/1993 | Edlund |
| 5,306,577 A | 4/1994 | Sprouse |
| 5,326,550 A | 7/1994 | Adris et al. |
| 5,335,628 A | 8/1994 | Dunbar |
| 5,344,721 A | 9/1994 | Sonai et al. |
| 5,354,547 A | 10/1994 | Rao et al. |
| 5,376,167 A | 12/1994 | Broutin et al. |
| 5,382,271 A | 1/1995 | Ng et al. |
| 5,393,325 A | 2/1995 | Edlund |
| 5,395,425 A | 3/1995 | Brown |
| 5,401,589 A | 3/1995 | Palmer et al. |
| 5,417,051 A | 5/1995 | Ankersmit et al. |
| RE35,002 E | 7/1995 | Matsubara et al. |
| 5,432,710 A | 7/1995 | Ishimaru et al. |
| 5,449,848 A | 9/1995 | Itoh |
| 5,458,857 A | 10/1995 | Collins et al. |
| 5,498,278 A | 3/1996 | Edlund |
| 5,500,122 A | 3/1996 | Schwartz |
| 5,509,942 A | 4/1996 | Dodge |
| 5,516,344 A | 5/1996 | Corrigan |
| 5,518,530 A | 5/1996 | Sakai et al. |
| 5,520,807 A | 5/1996 | Myrna et al. |
| 5,525,322 A | 6/1996 | Willms |
| 5,527,632 A | 6/1996 | Gardner |
| 5,536,405 A | 7/1996 | Myrna et al. |
| 5,536,488 A | 7/1996 | Mansour et al. |
| 5,580,523 A | 12/1996 | Bard |
| 5,589,599 A | 12/1996 | McMullen et al. |
| 5,612,012 A | 3/1997 | Soma et al. |
| 5,614,001 A | 3/1997 | Kosaka et al. |
| 5,616,430 A | 4/1997 | Aoyama |
| 5,637,259 A | 6/1997 | Galuszka et al. |
| 5,637,414 A | 6/1997 | Inoue et al. |
| 5,639,431 A | 6/1997 | Shirasaki et al. |
| 5,645,626 A | 7/1997 | Edlund et al. |
| 5,658,681 A | 8/1997 | Sato et al. |
| 5,677,073 A | 10/1997 | Kawatsu |
| 5,679,249 A | 10/1997 | Fendya et al. |
| 5,688,296 A | 11/1997 | Andrus, Jr. et al. |
| 5,705,082 A | 1/1998 | Hinson |
| 5,705,916 A | 1/1998 | Rudbeck et al. |
| 5,712,052 A | 1/1998 | Kawatsu |
| 5,714,276 A | 2/1998 | Okamoto |
| 5,734,092 A | 3/1998 | Wang et al. |

| | | |
|---|---|---|
| 5,738,708 A | 4/1998 | Peachey et al. |
| 5,741,474 A | 4/1998 | Isomura et al. |
| 5,741,605 A | 4/1998 | Gillett et al. |
| 5,759,712 A | 6/1998 | Hockaday |
| 5,780,179 A | 7/1998 | Okamoto |
| 5,782,960 A | 7/1998 | Ogawa et al. |
| 5,795,666 A | 8/1998 | Johnssen |
| 5,798,186 A | 8/1998 | Fletcher et al. |
| 5,811,065 A | 9/1998 | Sterenberg |
| 5,814,112 A | 9/1998 | Elliott et al. |
| 5,821,185 A | 10/1998 | White et al. |
| 5,833,723 A | 11/1998 | Kuwabara et al. |
| 5,858,314 A | 1/1999 | Hsu et al. |
| 5,861,137 A | 1/1999 | Edlund |
| 5,874,051 A | 2/1999 | Heil et al. |
| 5,888,273 A | 3/1999 | Buxbaum |
| 5,891,222 A | 4/1999 | Hilgendorff et al. |
| 5,897,766 A | 4/1999 | Kawatsu |
| 5,897,970 A | 4/1999 | Isomura et al. |
| 5,904,754 A | 5/1999 | Juda et al. |
| 5,931,987 A | 8/1999 | Buxbaum |
| 5,932,181 A | 8/1999 | Kim et al. |
| 5,938,800 A | 8/1999 | Verrill et al. |
| 5,980,989 A | 11/1999 | Takahashi et al. |
| 5,985,474 A | 11/1999 | Chen et al. |
| 5,997,594 A | 12/1999 | Edlund et al. |
| 5,998,053 A | 12/1999 | Diethelm |
| 6,007,931 A | 12/1999 | Fuller et al. |
| 6,042,956 A | 3/2000 | Lenel |
| 6,045,772 A | 4/2000 | Szydlowski et al. |
| 6,045,933 A | 4/2000 | Okamoto |
| 6,054,229 A | 4/2000 | Hsu et al. |
| 6,077,620 A | 6/2000 | Pettit |
| 6,083,637 A | 7/2000 | Walz et al. |
| 6,103,028 A | 8/2000 | Juda et al. |
| 6,103,411 A | 8/2000 | Matsubayashi et al. |
| 6,152,995 A | 11/2000 | Edlund |
| 6,165,633 A | 12/2000 | Negishi |
| 6,168,650 B1 | 1/2001 | Buxbaum |
| 6,171,574 B1 | 1/2001 | Juda et al. |
| 6,183,543 B1 | 2/2001 | Buxbuam |
| 6,183,895 B1 | 2/2001 | Kudo et al. |
| 6,187,066 B1 | 2/2001 | Benz et al. |
| 6,190,623 B1 | 2/2001 | Sanger et al. |
| 6,201,029 B1 | 3/2001 | Waycuilis |
| 6,221,117 B1 | 4/2001 | Edlund et al. |
| 6,231,831 B1 | 5/2001 | Autenrieth et al. |
| 6,238,465 B1 | 5/2001 | Juda et al. |
| 6,242,120 B1 | 6/2001 | Herron |
| 6,319,306 B1 | 11/2001 | Edlund et al. |
| 6,332,913 B1 | 12/2001 | Breitschwerdt et al. |
| 6,350,297 B1 | 2/2002 | Doyle et al. |
| 6,375,906 B1 | 4/2002 | Edlund et al. |
| 6,376,113 B1 | 4/2002 | Edlund et al. |
| 6,379,524 B1 | 4/2002 | Lee et al. |
| 6,383,670 B1 | 5/2002 | Edlund et al. |
| 6,395,405 B1 | 5/2002 | Buxbaum |
| 6,458,189 B1 | 10/2002 | Edlund et al. |
| 6,461,408 B2 | 10/2002 | Buxbaum |
| 6,494,937 B1 | 12/2002 | Edlund et al. |
| 6,495,277 B1 | 12/2002 | Edlund et al. |
| 6,497,856 B1 | 12/2002 | Lomax, Jr. et al. |
| 6,537,352 B2 | 3/2003 | Edlund et al. |
| 6,547,858 B1 | 4/2003 | Edlund et al. |
| 6,562,111 B2 | 5/2003 | Edlund et al. |
| 6,569,227 B2 | 5/2003 | Edlund et al. |
| 6,596,057 B2 | 7/2003 | Edlund et al. |
| 6,632,270 B2 | 10/2003 | Edlund et al. |
| 6,660,069 B2 | 12/2003 | Sato et al. |
| 6,719,831 B2 | 4/2004 | Edlund et al. |
| 6,719,832 B2 | 4/2004 | Edlund et al. |
| 6,723,156 B2 | 4/2004 | Edlund et al. |
| 6,767,389 B2 | 7/2004 | Edlund et al. |
| 6,783,741 B2 | 8/2004 | Edlund et al. |
| 6,824,593 B2 | 11/2004 | Edlund et al. |
| 6,890,672 B2 | 5/2005 | Dickman et al. |
| 2002/0182460 A1 | 12/2002 | Okamoto |
| 2003/0167690 A1 | 9/2003 | Edlund et al. |
| 2003/0182860 A1 | 10/2003 | DeVries |
| 2003/0192251 A1 | 10/2003 | Edlund et al. |
| 2004/0003720 A1 | 1/2004 | Beisswenger et al. |
| 2004/0065013 A1 | 4/2004 | DeVries |
| 2004/0083890 A1 | 5/2004 | Edlund et al. |
| 2004/0200459 A1 | 10/2004 | Bennett et al. |
| 2005/0188843 A1 | 9/2005 | Edlund et al. |
| 2005/0276705 A1* | 12/2005 | Pinkerton et al. ............ 417/415 |
| 2007/0062116 A1 | 3/2007 | Edlund et al. |
| 2008/0222954 A1 | 9/2008 | Adams et al. |

FOREIGN PATENT DOCUMENTS

| | | |
|---|---|---|
| EP | 0434562 A1 | 6/1991 |
| EP | 1065741 A2 | 1/2001 |
| JP | 45-14404 | 5/1970 |
| JP | 45-2642 | 9/1970 |
| JP | 57-145276 | 9/1982 |
| JP | 1-145302 | 6/1989 |
| JP | 1-145303 | 6/1989 |
| JP | 1-262903 | 10/1989 |
| JP | 4-163860 | 6/1992 |
| JP | 4-338101 | 11/1992 |
| JP | 6-134244 | 5/1994 |
| JP | 10-263372 | 10/1998 |
| WO | WO 97/25649 | 7/1997 |
| WO | WO 97/43796 | 11/1997 |
| WO | WO 99/30806 | 6/1999 |
| WO | WO 99/65097 | 12/1999 |
| WO | WO 00/04600 | 1/2000 |
| WO | WO 00/27507 | 5/2000 |
| WO | WO 01/12539 | 2/2001 |
| WO | WO 01/28662 | 4/2001 |
| WO | WO 01/64321 | 9/2001 |
| WO | WO 01/83086 | 11/2001 |

OTHER PUBLICATIONS

English-language abstract of Japanese Patent No. 1-145302, 1989.
English-language abstract of Japanese Patent No. 1-145303, 1989.
English-language abstract of Japanese Patent No. 1-262903, 1989.
English-language abstract of Japanese Patent No. 4-163860, Jun. 1992.
English-language abstract of Japanese Patent No. 432150, 1992.
English-language abstract of Japanese Patent No. 4-338101, 1992.
English-language abstract of Japanese Patent No. 5132301, 1993.
English-language abstract of Japanese Patent No. 5147902, 1993.
English-language abstract of Japanese Patent No. 6040701, 1994.
English-language abstract of Japanese Patent No. 6-134244, 1994.
English-language abstract of Japanese Patent No. 6176779, 1994.
English-language abstract of Japanese Patent No. 6345408, 1994.
English-language abstract of Japanese Patent No. 710910, 1995.
English-language abstract of Japanese Patent No. 7057758, 1995.
English-language abstract of Japanese Patent No. 8-287932, 1996.
English-language abstract of German language PCT Patent Publication No. WO 97/43796, 1997.
English-language abstract of Great Britain Patent No. 2,305,186, 1997.
English-language abstract of Japanese Patent No. 10-263372, 1998.
English-language abstract of Japanese Patent No. 11116202, 1999.
English-language abstract of German language PCT Patent Publication Serial No. WO 00/04600, Jan. 2000.
English-language abstract of German language PCT Patent Publication No. WO 01/64321, 2001.
Adris, A. M., et al., "A Fluidized Bed Membrane Reactor for the Steam Reforming of Methane," The Canadian Journal of Chemical Engineering, vol. 69, pp. 1061-1070 (Oct. 1991).
Amphlett, J. C., et al., "On Board Hydrogen Purification for Steam Reformer/PEM Fuel Cell Vehicle Power Plants," Energy Progress X, Proceedings of the 10th World Hydrogen Energy Conference, Cocoa Beach, Florida, U.S.A., vol. 3, pp. 1681-1690 (Jun. 1994).
Amphlett, J. C., et al., "Simulation of a 250 kW Diesel Fuel Processor/PEM Fuel Cell System," Fifth Grove Fuel Cell Symposium, Commonwealth Institute, London, U.K., p. 8 (Sep. 22-25, 1997).
Chai, M., et al., "Promotion of Methane Steam Reforming Using Ruthenium-Dispersed Microporous Alumina Membrane Reactor," Chemistry Letters, The Chemical Society of Japan, pp. 41-44 (1993).

"Compact, Lightweight Fuel Reformer for Fuel Cells," Argonne National Laboratory/U.S. Department of Energy (Jul. 1996).

Edlund, Dr. David and William Pledger, "Development of a Compact and Economical Steam Reformer for Fuel-Cell Systems," Fifth Grove Fuel Cell Symposium, Commonwealth Institute, London, U.K., p. 6 (Sep. 22-23, 1997).

Edlund, David J. and William A. Pledger, "The Practical Use of Metal-Membrane Reactors for Industrial Applications," The 1995 Membrane Technology Reviews, pp. 89-97 (Nov. 1994).

Emonts, B., et al., "Compact Methanol Reformer Test for Fuel-Cell Powered Light-Duty Vehicles," Fifth Grove Fuel Cell Symposium, Commonwealth Institute, London, U.K., p. 42 (Sep. 22-25, 1997).

Emonts, B., et al., "Compact Methanol Reformer Test for Fuel-Cell Powered Light-Duty Vehicles," Fifth Grove Fuel Cell Symposium, Commonwealth Institute, London, U.K., (no page no.), (Sep. 22-25, 1997).

Jørgensen, S. Lægsgaard, et al., "Application of Pd-Membranes for the Production of Pure Hydrogen in Methanol-Based Fuel Cell Powered Vehicles," Proceedings of Fourth Workshop: Optimisation of Catalytic Membrane Reactor Systems, ESF Network, Catalytic Membrane Reactors, Oslo, Norway, pp. 51-57 (May 30-31, 1997).

Knapton, A. G., "Palladium Alloys for Hydrogen Diffusion Membranes," Platinum Metals Review, vol. 21, 44-50 (1977).

Ledjeff-Hey, K., et al., "Compact Hydrogen Production Systems for Solid Polymer Fuel Cells," Fifth Grove Fuel Cell Symposium, Commonwealth Institute, London, U.K., p. 17 (Sep. 22-25, 1997).

Menzer, R., et al., "Fuel Processing in Fuel Cell Systems for Mobile Applications—Gasoline as Energy Carrier On-Bord," Fifth Grove Fuel Cell Symposium, Commonwealth Institute, London, U.K., (no page no.), (Sep. 22-25, 1997).

Minet, R. G., et al., "Experimental Studies of A Ceramic Membrane Reactor for the Steam/Methane Reaction at Moderate Temperatures (400-700° C.)," Symposium on Natural Gas Upgrading II Presented before The Division of Petroleum Chemistry, Inc., Meeting of American Chemical Society, San Francisco, California, U.S.A., pp. 245-248 (Apr. 1992).

Oertel, Michael, et al., "Steam Reforming of Natural Gas with Integrated Hydrogen Separation for Hydrogen Production," Chemical Engineering Techology, vol. 10, pp. 248-255 (1987).

Piwetz et al., "Hydrodesulfurization and Prereforming of Logistic Fuels for Use in Fuel Cell Applications," presented at the 1996 Fuel Cell Seminar held Nov. 17-20, 1996 in Orlando, Florida, pp. 780-783.

Privette et al., "Status of SOFCo SOFC Technology Development," presented at the 1996 Fuel Cell Seminar held Nov. 17-20, 1996 in Orlando, Florida, pp. 206-209.

Shu, J., et al., "Catalytic Palladium-Based Membrane Reactors: A Review," The Canadian Journal of Chemical Engineering, vol. 69, pp. 1036-1060 (Oct. 1991).

Teagan, W. P., et al., "Cost Reduction of Fuel Cells for Transportation Applications—Fuel Processing Options," Fifth Grove Fuel Cell Symposium, Commonwealth Institute, London, U.K. (Sep. 22-25, 1997).

Engineers Edge. "Basic Hydraulic Open Center System Schematic." 2000-2006.

Brennan, James R. "Combustion Gas Turbine Fuel Pumps." Imo Industries Inc., 1997.

d'Auria, A. et al. "Engineering Layouts for the CMS Gas System Modules." Feb. 20, 2001.

US 6,340,380, 01/2002, Frost et al. (withdrawn)

* cited by examiner

SYSTEMS AND METHODS FOR RELIABLE FEEDSTOCK DELIVERY AT VARIABLE DELIVERY RATES

RELATED APPLICATION

This present application claims priority under 35 U.S.C. §119(e) to U.S. Provisional Patent Application Ser. No. 61/008,080, which was filed on Dec. 17, 2007, the entire disclosure of which is hereby incorporated by reference.

FIELD OF THE DISCLOSURE

The present disclosure relates generally to hydrogen-producing fuel processing assemblies and fuel cell systems, and more particularly to feedstock delivery systems therefor.

BACKGROUND OF THE DISCLOSURE

A hydrogen-producing fuel processing assembly is an assembly of one or more devices or components that includes a fuel processor with a hydrogen-producing region that is adapted to convert one or more feedstocks into a product stream containing hydrogen gas as a majority component. In operation, the hydrogen-producing region is typically operated at an elevated temperature and pressure and contains a suitable catalyst to produce at least hydrogen gas from the feedstock(s) delivered thereto. The composition, flow rate, and properties of the feedstock(s) delivered to the hydrogen-producing region may affect the performance of the hydrogen-generation assembly.

The produced hydrogen gas may be used in a variety of applications. One such application is energy production, such as in electrochemical fuel cells. An electrochemical fuel cell is a device that converts a fuel and an oxidant to electricity, a reaction product, and heat. For example, fuel cells may convert hydrogen and oxygen gases into water and electricity. In such fuel cells, the hydrogen gas is the fuel, the oxygen gas is the oxidant, and the water is the reaction product. Fuel cells are typically coupled together to form a fuel cell stack.

A hydrogen-producing fuel cell system is a system that includes a hydrogen-producing processing assembly that is adapted to produce hydrogen gas and a fuel cell stack that is adapted to receive hydrogen gas produced by the fuel processing assembly and to generate an electric current therefrom. When the flow rate of hydrogen gas to the fuel cell stack is affected by the flow rate of feedstock(s) to the hydrogen-producing region of the hydrogen-generation assembly, this may affect the performance of the fuel cell stack and/or its ability to satisfy an applied load thereto.

In many fuel processing assemblies, the feed stream for the hydrogen-producing region is a liquid feed stream. The liquid feed stream is drawn from a suitable source or reservoir by a pump, and thereafter delivered to the hydrogen-producing region, typically after vaporizing the feed stream. In many such fuel processing assemblies, the liquid feed stream includes at least one of water and a carbon-containing feedstock, such as an alcohol or hydrocarbon. The rate at which the feed stream is pumped from the source to the hydrogen-producing region is typically related to the demand for hydrogen gas, with a greater flow rate of the feed stream provided when there is a greater demand for hydrogen gas produced by the fuel processing assembly, and a lesser flow rate when there is a lower demand. Reliable provision of the desired flow rate of the feed stream within a range of flow rates is a design goal for a fuel processing assembly, as the flow rate of feed stream affects the overall performance and/or operating conditions of the fuel processing assembly, and any hydrogen-producing fuel cell system of which the fuel processing assembly forms a portion thereof.

DETAILED DESCRIPTION AND BEST MODE OF THE DISCLOSURE

Figure 1:
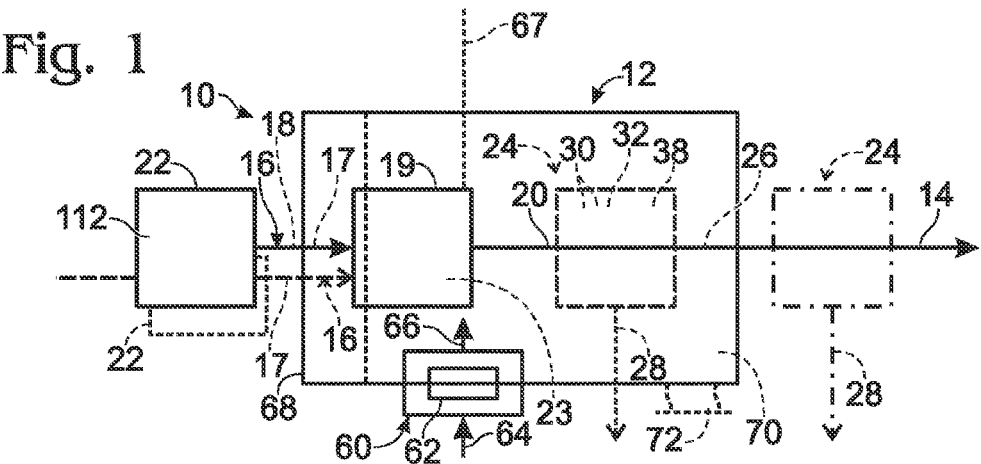
FIG. 1 is a schematic diagram of a fuel processing assembly with a feedstock delivery system according to the present disclosure.

A fuel processing assembly containing a feedstock delivery system 22 according to the present disclosure is shown in FIG. 1 and is indicated generally at 10. Fuel processing assembly 10 includes a hydrogen-producing fuel processor 12 that is adapted to produce a product hydrogen stream 14 containing hydrogen gas, and in many embodiments at least substantially pure hydrogen gas, from one or more feed streams 16. Feed stream 16 is drawn as a liquid stream from one or more sources 112 by the feedstock delivery system. Feed stream 16 includes at least one carbon-containing feedstock 18 and may include water 17. Illustrative, non-exclusive examples of suitable liquid carbon-containing feedstocks 18 include at least one hydrocarbon or alcohol. Illustrative, non-exclusive examples of suitable liquid hydrocarbons include diesel, kerosene, gasoline, and the like. Illustrative, non-exclusive examples of suitable alcohols include methanol, ethanol, and polyols, such as ethylene glycol and propylene glycol.

When the carbon-containing feedstock is miscible with water, the carbon-containing feedstock may be, but is not required to be, delivered to the fuel processor in the same feed stream as the water component of feed stream 16, such as shown in FIG. 1 by reference numerals 17 and 18 pointing to the same feed stream 16. For example, when the fuel processor receives a feed stream containing water and a water-soluble alcohol, such as methanol, these components may be premixed and delivered as a single feed stream. As an illustrative, non-exclusive example, a reforming feed stream may contain approximately 25-75 vol % methanol or ethanol or another suitable water-miscible carbon-containing feedstock, and approximately 25-75 vol % water. For feed streams formed (at least substantially) of methanol and water, the streams will typically contain approximately 50-75 vol % methanol and approximately 25-50 vol % water. Feed streams 16 containing ethanol or other water-miscible alcohols will typically contain approximately 25-60 vol % alcohol and approximately 40-75 vol % water. For hydrogen-generating assemblies that utilize steam reforming or autothermal reforming reactions to produce hydrogen gas, an illustrative, non-exclusive example of a particularly well-suited feed stream contains 69 vol % methanol and 31 vol % water, although other compositions and liquid carbon-containing feedstocks may be used without departing from the scope of the present disclosure. It is within the scope of the present disclosure that such a feed stream that contains both water and at least one carbon-containing feedstock may be used as the feed stream for hydrogen-producing region 19 and as a combustible fuel stream for a heating assembly (when present) that is adapted to heat at least the hydrogen-producing region of the fuel processing assembly, such as to a suitable hydrogen-producing temperature.

While a single feed stream 16 is shown in FIG. 1, it is within the scope of the disclosure that more than one stream 16 may be used and that these streams may contain the same or different feedstocks. This is schematically illustrated by the inclusion of a second feed stream 16 in dashed lines in FIG. 1. Similarly, FIG. 1 also illustrates in dashed lines that each feed stream 16 may (but is not required to be) associated with a different feedstock delivery system 22, or portions thereof. For example, when more than one feedstock delivery system 22 is utilized, the systems may (but are not required to) draw at least a portion of their outlet streams from a common supply. When feed stream 16 contains two or more components, such as a carbon-containing feedstock and water, the components may be delivered in the same or different feed streams.

Fuel processor 12 includes any suitable device, or combination of devices, that is adapted to produce via chemical reaction predominately hydrogen gas from feed stream(s) 16. Accordingly, fuel processor 12 includes a hydrogen-producing region 19, in which an output stream 20 containing hydrogen gas is produced by utilizing any suitable hydrogen-producing mechanism(s). Output stream 20 includes hydrogen gas as at least a majority component. Output stream 20 may include one or more additional gaseous components, and thereby may be referred to as a mixed gas stream, which contains hydrogen gas as its majority component, and which also contains other gases.

An illustrative, non-exclusive example of a suitable mechanism for producing hydrogen gas from feed stream(s) 16 delivered by feedstock delivery system 22 is steam reforming, in which a reforming catalyst is used to produce hydrogen gas from at least one feed stream 16 containing a carbon-containing feedstock 18 and water 17. In a steam reforming process, hydrogen-producing region 19 contains a suitable steam reforming catalyst 23, as indicated in dashed lines in FIG. 1. In such an embodiment, the fuel processor may be referred to as a steam reformer, hydrogen-producing region 19 may be referred to as a reforming region, and output, or mixed gas, stream 20 may be referred to as a reformate stream. As used herein, reforming region 19 refers to any hydrogen-producing region utilizing a steam reforming hydrogen-producing mechanism. Illustrative, non-exclusive examples of suitable steam reforming catalysts include copper-zinc formulations of low temperature shift catalysts and a chromium formulation sold under the trade name KMA by Süd-Chemie, although others may be used. The other gases that are typically present in the reformate stream include carbon monoxide, carbon dioxide, methane, steam, and/or unreacted carbon-containing feedstock.

Another illustrative example of a suitable hydrogen-producing reaction that may be utilized in hydrogen-producing region 19 is autothermal reforming, in which a suitable autothermal reforming catalyst is used to produce hydrogen gas from water and a carbon-containing feedstock in the presence of air. When autothermal reforming is used, the fuel processor further includes an air delivery assembly 67 that is adapted to deliver an air stream to the hydrogen-producing region, as indicated in dashed lines in FIG. 1. Autothermal hydrogen-producing reactions utilize a primary endothermic reaction that is utilized in conjunction with an exothermic partial oxidation reaction, which generates heat within the hydrogen-producing region upon initiation of the initial hydrogen-producing reaction. Further illustrative, non-exclusive examples of other suitable mechanisms for producing hydrogen gas include pyrolysis and catalytic partial oxidation of a carbon-containing feedstock, in which case the feed stream does not contain water.

At least the hydrogen-producing region 19 of fuel processing assembly 10 is designed to be operated at an elevated temperature, or within an elevated temperature range, when being utilized to produce hydrogen gas for product hydrogen stream 14. This hydrogen-producing temperature, or temperature range, may be achieved and/or maintained in hydrogen-producing region 19 through the use of a heating assembly 60 or other suitable heat source. Hydrogen-producing steam reformers typically operate at temperatures in the range of 200° C.-900° C. Temperatures outside of this range are within the scope of the disclosure. When the carbon-containing feedstock is methanol, the steam reforming reaction will typically operate in a temperature range of approximately 200-500° C. Illustrative subsets of this range include 350-450° C., 375-425° C., 375-400° C., and 400-450° C. When the carbon-containing feedstock is a hydrocarbon, ethanol, or another alcohol, a temperature range of approximately 400-900° C. will typically be used for the steam reforming reaction. Illustrative subsets of this range include 750-850° C., 725-825° C., 650-750° C., 700-800° C., 700-900° C., 500-800° C., 400-600° C., and 600-800° C.

It is within the scope of the present disclosure for the hydrogen-producing region 19 to include two or more zones, or portions, each of which may be operated at the same or at different temperatures. For example, when the carbon-containing feedstock is, or includes, a hydrocarbon, in some embodiments it may be desirable to include two different hydrogen-producing portions, with one operating at a lower temperature than the other to provide a pre-reforming region. In such an embodiment, the fuel processing system may alternatively be described as including two or more hydrogen-producing regions.

At least the hydrogen-producing region 19 of fuel processing assembly 10 also is configured to be operated at an elevated pressure, such as a pressure of at least 40 or at least 50 psi. This pressure may be referred to herein as a hydrogen-producing pressure. Additionally or alternatively, a hydrogen-producing region of a fuel processing assembly may be adapted to operate within a hydrogen-producing pressure range. As illustrative, non-exclusive examples, steam and autothermal reformers are typically operated at such hydrogen-producing pressures as pressures in the range of 40-1000 psi, including pressures in the range of 40-100 psi, 50-150 psi, 50-200 psi, etc. Pressures outside of this range may be used and are within the scope of the present disclosure. For example, in some embodiments, a lower pressure may be sufficient, such as when the hydrogen-producing region is adapted to produce hydrogen gas using a partial oxidation and/or autothermal reforming reaction and/or when the fuel processing assembly does not utilize a pressure-driven separation process to increase the purity of the hydrogen gas produced in the hydrogen-producing region. When the fuel processing assembly includes a purification, or separation, region, such as described herein, this region also may be designed to operate at an elevated pressure and/or within an elevated pressure range and/or at an elevated temperature and/or within an elevated temperature range.

The particular maximum and minimum operating pressures for a particular fuel processing assembly may vary according to a variety of possible factors. Illustrative, non-exclusive examples of such factors may include, but are not limited to, the hydrogen-producing reaction utilized in hydrogen-producing region 19, the composition of feed stream 16, the viscosity of the liquid in feed stream 16, the delivery conduit construction, size, and/or configuration, the construction of the fuel processing assembly, the pressure requirements of the fuel processing assembly and/or fuel cell system downstream from the hydrogen-producing region, design choices and tolerances, etc. For example, some fuel processing assemblies may be designed to maintain an elevated pressure in at least the hydrogen-producing region, and optionally at least one purification region thereof, by utilizing a restrictive orifice or other suitable flow restrictor downstream of the hydrogen-producing region, and optionally downstream of a purification region if it is also desirable to maintain the purification region at an elevated pressure.

The pressure for at least the hydrogen-producing region of the fuel processing assembly, and in some embodiments also for a pressure-driven purification region thereof, may be provided by the pressure of feed stream 16. Specifically, the pressurized feed stream, or a gas stream produced therefrom, pressurizes these components of the fuel processing assembly. Accordingly, feedstock delivery system 22 may additionally or alternatively be described as pressurizing at least the hydrogen-producing region 19 of the hydrogen-producing fuel processing assembly. It follows then that variations or oscillations in the flow rate and/or pressure of feed stream 16 may affect the operating parameters of other aspects of the fuel processing assembly and/or an associated fuel cell stack.

As an illustrative, non-exclusive example, when fuel processing assembly 10 includes a heating assembly that combusts a portion of the gases produced by the hydrogen-producing region for fuel to heat at least the hydrogen-producing region, it follows that interruptions in the flow of feed stream 16 to the hydrogen-producing region may affect the flow rate of fuel to the heating assembly. This interruption in fuel may affect the temperature of the hydrogen-producing region, which may in turn affect the efficiency and/or amount of hydrogen gas produced in the hydrogen-producing region. This reduction in hydrogen output may affect the ability of the fuel processing assembly to satisfy the demand for hydrogen gas by an associated fuel cell stack, which in turn may affect that fuel cell system's ability to satisfy an applied load. As another illustrative, non-exclusive example, interruptions in the flow rate of feed stream 16 to the hydrogen-producing region of the fuel processing assembly may also affect the pressure within the hydrogen-producing region, and thus in the output stream therefrom, which in turn may affect the performance of any pressure-driven separation process downstream from the hydrogen-producing region. As another illustrative, non-exclusive example, frequent and sudden starting and stopping of the flow of feed stream 16 from the feedstock delivery system may affect components of the feedstock delivery system, such as by causing wear on a pump and/or drive system therefor.

According to the present disclosure, feedstock delivery system 22 is adapted to draw or otherwise receive at least a liquid carbon-containing feedstock from a supply, or source, and to deliver a feed stream 16 containing at least the carbon-containing feedstock for use in at least the hydrogen-producing region of the fuel processing assembly. Feedstock delivery system 22 may utilize any suitable delivery mechanism, such as a positive displacement or other suitable pump or mechanism for propelling and pressurizing liquid fluid streams. When one or more pumps are used, the number, type and capacity of the pumps may vary, such as with respect to the desired flow rate of liquid to be pumped thereby, the desired pressure, or pressure range, to be provided to the liquid, the composition of the liquid, whether or not the flow rate is intended to be selectively varied, etc. Illustrative, non-exclusive examples of pumps that may be used include diaphragm pumps, metering pumps, gear pumps, and the like.

Figure 2:
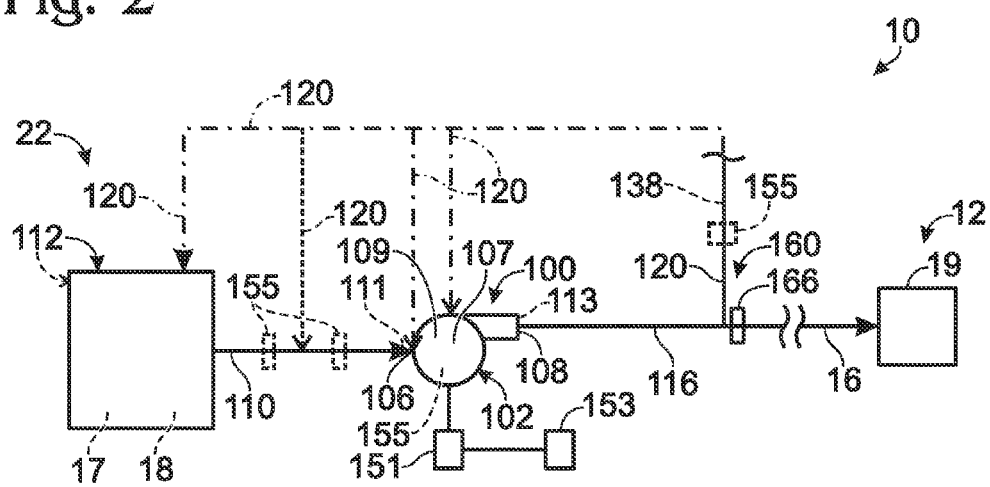
FIG. 2 is a schematic diagram of a feedstock delivery system according to the present disclosure.

An illustrative, non-exclusive example of a feedstock delivery system 22 according to the present disclosure is shown in FIG. 2 and is adapted to deliver feed stream 16 to hydrogen-producing region 19 of the fuel processor 12 of fuel processing assembly 10. As shown, feedstock delivery system 22 includes a pump assembly 100 that includes at least one pump 102. Pump assembly 100 includes an inlet 106 and an outlet 108, with the inlet being in fluid communication with a liquid feedstock supply, or source, 112, and the outlet being in fluid communication with fuel processor 12. When pump assembly includes 100 includes a single pump 102, inlet 106 and outlet 108 may be described as being associated with the pump. When pump assembly 100 includes more than one pump, each pump within the assembly may include an inlet in fluid communication with a liquid feedstock supply and an outlet in fluid communication with the fuel processor. A pump 102 may include a working portion, or pumping mechanism, 109 that is located generally between the pump assembly's inlet and outlet and which pressurizes fluid that is drawn into a cavity 107 of the pump via inlet 106. Pump cavity 107 may also be referred to as the pump's internal fluid chamber 107.

Supply 112 includes any suitable type and/or number of reservoirs and/or other sources from which a liquid inlet stream 110 may be drawn or otherwise received by inlet 106 of pump assembly 100. Illustrative, non-exclusive examples of suitable supplies 112 include tanks, canisters, and other liquid vessels, which may be pressurized or unpressurized. Liquid inlet stream 110 contains at least one component of feed stream 16, such as water 17 and/or a carbon-containing feedstock 18. As indicated in FIG. 2 in dashed lines, and as discussed herein, it is also within the scope of the present disclosure that liquid inlet stream 110 and/or supply 112 contain at least two different components of feed stream 16, such as water 17 and a liquid carbon-containing feedstock 18. Therefore, it is within the scope of the present disclosure that liquid inlet stream 110 may include a single component of feed stream 16, may contain more than one component of feed stream 16, and/or may include all of the component(s) of feed stream 16. The components of feed stream(s) 16 may also be referred to as feedstocks from which hydrogen-producing region 19 produces hydrogen gas.

When feed stream 16 contains both water and a liquid carbon-containing feedstock, the carbon-containing feedstock may be selected to be miscible with water. For example, methanol and many other alcohols are miscible with water. In some embodiments, the feed stream may also include an emulsifier or other suitable additive that promotes mixing of water and a carbon-containing feedstock that otherwise is not, or is not suitably, miscible with water at the operating conditions utilized by the feedstock delivery system. When the feed stream contains two or more feedstocks, the feedstocks may be mixed in a common source, or supply, or may be drawn from separate sources and thereafter mixed.

Pump assembly 100 is adapted to draw or otherwise receive liquid inlet stream 110 from supply 112 and to emit a liquid outlet stream 116 having an increased pressure relative to liquid inlet stream 110 and within a hydrogen-producing pressure range. Accordingly, feedstock delivery system 22 may be described as being adapted to pump a liquid stream containing at least one feedstock for hydrogen-producing region 19 from a liquid feedstock supply. Additionally or alternatively, liquid inlet stream 110 may be referred to as a lower pressure stream, and liquid outlet stream 116 may be referred to as a higher pressure stream. When the pump assembly 100 includes more than one pump, the pumps may cooperate to draw liquid inlet stream 110 and/or emit liquid outlet stream 116. Additionally or alternatively, the pumps may each be adapted to draw a liquid inlet stream 110 from the same or different sources 112 and/or to each emit a liquid outlet stream 116 therefrom. Additionally or alternatively, a pump assembly 100 may be adapted to draw from the liquid supply a liquid inlet stream containing at least a carbon-containing feedstock and to emit a liquid outlet stream at least intermittently within or above the hydrogen-producing pressure range, the pump assembly having an inlet for receiving the liquid inlet stream and an outlet for emitting the liquid outlet stream.

Figure 3:
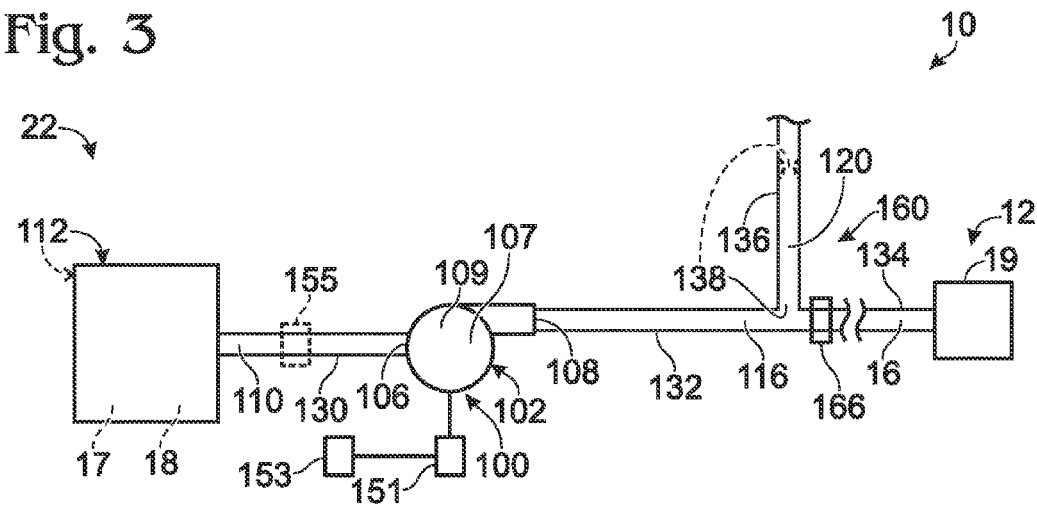
FIG. 3 is a schematic diagram of another feedstock delivery system according to the present disclosure.

Described in terms of the fluid conduits of, or associated with, feedstock delivery system 22, and as illustrated somewhat schematically in FIG. 3, the feedstock delivery system may be described as including an intake conduit 130 through which liquid inlet stream 110 is drawn or otherwise received from supply 112 to pump assembly 100. The feedstock delivery system further includes an outlet, or output, conduit 132 through which liquid outlet stream 116 is emitted from the pump assembly's outlet 108. The output conduit is in fluid communication with a delivery conduit 134, through which at least a portion of liquid outlet stream 116 may be delivered to hydrogen-producing region 19 to form at least a portion of feed stream 16. Feed stream 16 may therefore also be described as a delivery stream. As discussed in more detail herein, liquid outlet stream 116 is a liquid stream, but feed stream 16 may be vaporized in hydrogen-producing region 19 and/or prior to delivery thereto, such as in a vaporization region that receives feed stream 16 as a liquid and outputs an at least partially, if not completely, vaporized gaseous feed stream 16.

A pump 102 of a pump assembly 100 may include any suitable drive mechanism and may be powered by any suitable power source, such as are schematically indicated at 151 and 153, respectively, in FIGS. 2 and 3. An illustrative, non-exclusive example of a suitable drive assembly 151 is a motor that drives the movement of the pump's working portion 109, directly or indirectly. It is within the scope of the present disclosure that the drive assembly may couple the rotational output of the pump to the working portion of the pump via any suitable belt, gear assembly, transmission, or other linkage. It is also within the scope of the present disclosure that the drive assembly may be adapted to modulate the rotational output of the motor, such as to increase or decrease the relative rate of rotation, such as with a suitable gear assembly or transmission.

Power source 153 may include a component of a hydrogen-producing fuel cell system, such as the subsequently described fuel cell stack and/or energy storage device. Additional illustrative, non-exclusive examples include a power supply that is independent of power output produced by the fuel cell system, such as an external, or dedicated, battery, a line current from an electrical grid, etc. While not required to all embodiments, pump 102 may be a single-speed, or single-output, pump that is adapted to either be in an on, or active, configuration in which the pump is at least intermittently receiving liquid inlet stream 110 and at least intermittently emitting liquid outlet stream 116, or an off, or unpowered, configuration in which the pump is not emitting liquid outlet stream 116. By at least intermittently receiving and at least intermittently emitting during an on, or active, configuration of a pump, it is meant that a pump may not receive and/or emit a continuous stream at a constant flow rate and/or at a constant pressure, but rather may receive and/or emit a stream in pulses, in a non-constant flow rate, and/or in non-constant pressures, etc., such as may depend on a particular configuration of a pump being used and/or on the power being delivered to the pump. For example, the actual output of the pump may vary with the voltage of the power output delivered to the pump, which in some embodiments may tend to vary, for example, depending on an overall load on a corresponding power supply. In some embodiments, the pump may be a variable speed pump that is designed to selectively operate at two or more speeds and/or within a range of speeds. In some embodiments, the power source for the pump may be configured to regulate the duty cycle, or power, provided to the pump to thereby regulate or control the output of the pump.

In addition to at least one pump 102, feedstock delivery systems 22 according to the present disclosure further include a stall prevention mechanism 160 that is adapted to prevent stalling of a pump 102 during operation of the feedstock delivery system. Specifically, it has been discovered that pumps that are effective for providing a desired flow of feed stream 16 for the fuel processing assembly during moderate-to-high relative flow rates, or utilization, may have difficulty doing so without stalling when utilized at lower flow rates and/or when the desired flow rate is reduced. Stalling may result when pump 102 is a pump in which the pressure immediately downstream of the pump will tend to oscillate during normal use of the pump. An illustrative, non-exclusive example of such a pump is a diaphragm pump, although the present disclosure is not limited to pumps 102 that are diaphragm pumps. However, for the purpose of illustrating how stalling may occur, the following discussion will describe pump 102 as being a diaphragm pump.

Diaphragm pumps are positive displacement pumps, which are sequentially configured between refill cycles (or strokes) and discharge cycles (or strokes), such as responsive to drive assembly 151 propelling movement of the pump's working portion 109. In diaphragm pumps, discharge cycles may also be referred to as compression, or pressurization, cycles. Positive displacement pumps generally, and diaphragm pumps in particular, include inlet and outlet check valves that respectively open and close to permit or preclude flow of fluid, such as liquid feedstocks, into and out of the pump's internal fluid chamber 107. These check valves are schematically illustrated in FIG. 2 at 111 and 113, respectively, and it is within the scope of the present disclosure that other suitable flow-control valves or mechanisms may be utilized. During the refill stroke, the outlet valve checks (closes) and the inlet valve opens to permit liquid feedstock to be drawn into the pump's chamber. Then, the inlet valve checks and the pump transitions to its discharge stroke in which the outlet valve opens to release the higher pressure liquid as liquid outlet stream 116. Because of the sequential cycles, or strokes, of positive displacement pumps, such pumps may be described as being adapted to at least intermittently emit a liquid stream within a pressure range, with such pressure range being greater than a pressure at which the positive displacement pump receives a liquid stream.

Since the pressure upstream of the inlet valve tends to be at or near ambient pressure, opening and closing of the inlet check valve is fairly reliable regardless of the degree of utilization of the pump within its range of rated flow rates and/or changes therein. However, the pressure of liquid outlet stream 116 downstream from the pump may affect the ability of the outlet check valve to reliably open and close. Specifically, the pressure downstream of the pump may prevent the outlet check valve from being able to open, especially when the pump is operating at a lower power or lower output level. As used herein, the terms upstream and downstream refer to the relative locations of the elements being compared in terms of the direction of fluid flow therebetween. For example, and in the context of FIG. 2, liquid inlet stream 110 and source 112 may be described as being upstream of pump assembly 100, while hydrogen-producing region 19 may be described as being downstream of pump assembly 100.

When the outlet check valve cannot open, or reliably open, due to the pressure differential across the outlet check valve, the pump may be described as being in a stalled condition. This stalled condition may be described as occurring when the pump is not able to generate a pressure that exceeds the threshold pressure for the pump's outlet check valve to open. This potential for stalling may be especially prevalent when the utilization of the pump is suddenly reduced, such as when it is desirable to reduce, but not stop, the rate at which hydrogen gas is produced by the fuel processing assembly. Illustrative, non-exclusive utilization ranges where stalling may be more likely to occur include when the pump is operating at less than 75%, less than 70%, less than 60%, less than 50%, 40-70%, 50-75%, etc. of capacity, and/or when the pump is transitioned to one of the above operating percentages after being operated at 75-80% or more of its capacity. When the pump stalls, the flow of pressurized liquid therefrom to form liquid outlet stream 116 is interrupted even though drive assembly 151 is attempting to drive the rotation or otherwise actuate the pump's working portion. This has a potential to result in damage to the pump and/or its drive assembly. Once stalled, the pressure in the hydrogen-producing region, and upstream thereof, will tend to reduce over time as the feed stream is reacted in the hydrogen-producing region. When the pressure is sufficiently reduced for the pump to produce a pressure that achieves or exceeds the outlet check valve's threshold pressure, then the outlet check valve is able to open, and flow of liquid outlet stream 116 is resumed.

Feedstock delivery systems 22 according to the present disclosure include stall prevention mechanism 160 and thus are configured to reduce the potential for stalling of the pump, and thereby provide for more reliable delivery of feed stream 16 to the fuel processor. As indicated in FIGS. 2 and 3, stall prevention mechanism 160 includes a check valve 166 downstream from the pump (and when present, downstream from the pump's associated outlet check valve). Check valve 166 prevents feed stream 16 from flowing back toward the pump (i.e., away from the hydrogen-producing region). Perhaps more importantly in the context of the present disclosure, check valve 166 enables the pressure of liquid outlet stream 116 to be reduced, even significantly, without an immediate corresponding reduction in the pressure of at least the hydrogen-producing region of the fuel processor. Accordingly, the pressure within the hydrogen-producing region, and any downstream purification region, is not immediately reduced simply as a result of a sudden decrease in the pressure of liquid outlet stream 116. Check valve 166 isolates the pressure in outlet conduit 132 (shown in FIG. 3) from the pressure in the hydrogen-producing region, at least during the refill cycle, or refill stroke, of pump 102. Additionally or alternatively, check valve 166 may be described as being positioned between the outlet conduit 132 and the hydrogen-producing region and adapted to isolate pressure in the outlet conduit from pressure in the hydrogen-producing region during periods in which the pump assembly is not emitting the liquid outlet stream within or above the hydrogen-producing pressure range, for example, due to the pump assembly including a positive displacement pump that only intermittently emits the liquid outlet stream within or above the hydrogen-producing pressure range.

Stall prevention mechanism 160 is also configured to produce a bleed stream 120, at least during the refill cycle of the pump. Bleed stream 120 is emitted from liquid outlet stream 116, or elsewhere downstream from the pump assembly's outlet and upstream from check valve 166. As shown in FIG. 3, bleed stream 120 flows from outlet conduit 132 in a bleed conduit 136, with a bleed orifice 138 being shown providing a fluid interface between outlet conduit 132 and bleed conduit 136. Although schematically indicated as a single orifice, or fluid passage, in FIG. 3, it is within the scope of the present disclosure that bleed orifice 138 may be implemented with any suitable number, size, and type of openings or other passages that permit the liquid feedstock emitted from the pump assembly to flow into the bleed conduit from outlet conduit 132. In solid lines in FIG. 3, bleed orifice 138 is schematically illustrated as the inlet into bleed passage 136, with the bleed orifice and bleed passage having the same internal dimensions. It is within the scope of the present disclosure that the bleed orifice may be of any suitable size, configuration, and position relative to the passage, such as with the bleed orifice having a smaller internal dimension (i.e., opening size) than the bleed passage. It is also within the scope of the present disclosure that the bleed orifice may be implemented as a constriction or reduced diameter portion at the inlet of, or within, the bleed passage. This is schematically illustrated in dashed lines in FIG. 3, with a bleed orifice 138 indicated within the bleed passage and having a reduced opening (or internal dimension) than the bleed passage. Bleed stream 120, bleed conduit 136, and bleed orifice 138 may additionally or alternatively be referred to herein as pressure-relief stream 120, pressure-relief conduit 136, and pressure-relief orifice 138, respectively. Bleed stream 120 has the same composition as liquid inlet stream 110 and/or liquid output stream 116. Bleed stream 120 reduces the amount of fluid in liquid outlet stream 116, such as the amount of fluid between the pump and check valve 166, and thus reduces the pressure downstream from the pump assembly. This reduction in pressure results in a reduction in the threshold pressure that must be achieved or exceeded for a positive displacement pump's outlet check valve to open and thus permit pressurized liquid to be emitted from the pump.

In FIGS. 2 and 3, bleed stream 120 and/or bleed conduit 136 are shown in partial fragmentary format to graphically indicate that the stream and/or conduit may flow and/or extend to a variety of locations without departing from the scope of the present disclosure. Specifically, for stall prevention mechanism 160 to operate, the bleed stream should remove pressurized liquid from the outlet conduit. Where this liquid flows and/or how it is utilized may vary without departing from the scope of the present disclosure. In some embodiments, the bleed stream may be utilized by the fuel processing assembly, whereas in others it may not. Illustrative, non-exclusive examples, several of which are illustrated in dashed lines in FIG. 2, include combusting the bleed stream (to produce a heated exhaust stream that is used by the fuel processing assembly) or otherwise for its heat value, returning the bleed stream to supply 112, returning the bleed stream to mix with inlet stream 110, returning the bleed stream to the pump's inlet 106 or the pump's internal fluid chamber 107, delivering the bleed stream to be used as a fuel for a heating assembly for the fuel processing assembly, etc. Accordingly, in some embodiments, the bleed conduit may be described as being in fluid communication between the outlet conduit and at least one of the liquid supply, the inlet conduit, the pump assembly, and a burner associated with the hydrogen-producing fuel processing assembly, and through which a bleed stream at least intermittently flows.

Also shown in dashed lines in FIGS. 2 and 3 are optional filters 155 that may be incorporated into feedstock delivery systems 22 according to the present disclosure, such as to trap particulate in the liquid streams flowing through the feedstock delivery system.

When implementing stall prevention mechanism 160, it may be desirable to size, relative to the outlet conduit, the bleed conduit 136 and/or the bleed orifice 138 so that the desired degree of pressure reduction is provided. Specifically, if the size of the bleed conduit and/or orifice is too small, stall prevention mechanism 160 may not be able to sufficiently reduce the pressure in outlet conduit 132 during a refill cycle of the pump for the pump to be able to transition to a pressurization cycle without stalling. However, and especially in the case of a conduit and/or orifice that is not selectively opened and closed as the pump alternates between discharge and refill cycles (as optionally discussed herein), it also follows that too large of a bleed conduit and/or orifice may result in a feedstock delivery system that will not be able to effectively provide a feed stream 16 within the required hydrogen-producing pressure range (and/or a sufficient flow rate of such a stream) because too much of liquid outlet stream 116 will flow through the bleed conduit as bleed stream 120. It follows from this latter discussion that the flow rate of pressurized liquid emitted from the pump assembly during a pump's discharge cycle should exceed the flow rate of liquid through bleed conduit 136 during the pressurization cycle.

In some embodiments, at least a portion of the bleed conduit is sized, relative to the outlet conduit, to reduce pressure in the outlet conduit during periods in which the pump assembly is not emitting the liquid outlet stream within or above the hydrogen-producing pressure range, for example, due to the pump assembly including a positive displacement pump that only intermittently emits the liquid outlet stream within or above the hydrogen-producing pressure range. Additionally or alternatively in some embodiments, the bleed conduit may include a bleed orifice that is sized, relative to the outlet conduit, to reduce pressure in the outlet conduit during periods in which the pump assembly is not emitting the liquid outlet stream within or above the hydrogen-producing pressure range, for example, due to the pump assembly including a positive displacement pump that only intermittently emits the liquid outlet stream within or above the hydrogen-producing pressure range.

In some embodiments, it may be helpful to utilize a drive assembly 151 for a pump 102 of a pump assembly 100 that employs a sufficient gear reduction that this parameter is satisfied (i.e., to further ensure an appropriate flow rate of the bleed stream). In experiments in which pump 102 is designed to provide up to 7-8 milliliters per minute of pressurized liquid feedstock(s) at a pressure up to 100 psi, a 90:1 gear reduction has proven effective to result in a pump velocity of 0.5-1 revolution per second. This example is provided for the purpose of illustration and not limitation, as it is within the scope of the present disclosure for the feedstock delivery system to be designed to provide a greater or lesser flow rate, an output stream with a higher or lower pressure, and for the gear reduction (if utilized) to be greater or less than in the above example. It is also within the scope of the present disclosure to utilize more than one pump, more than one reforming region, and/or more than one feedstock delivery system with a fuel processing assembly according to the present disclosure.

Figure 4:
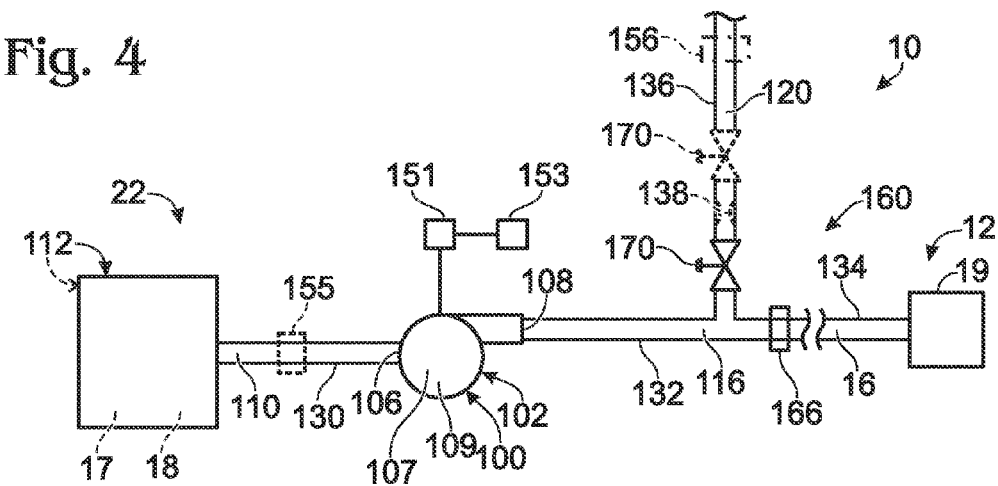
FIG. 4 is a schematic diagram of another feedstock delivery system according to the present disclosure.

Another illustrative, non-exclusive example of a feedstock delivery system 22 with a stall prevention mechanism 160 according to the present disclosure is shown in FIG. 4. The example shown in FIG. 4 may be utilized with any of the other components, variants, and subelements, of the feedstock delivery systems, fuel processing assemblies, and fuel cell systems otherwise described, illustrated and/or incorporated herein without departing from the scope of the present disclosure. In FIG. 4, stall prevention mechanism 160 includes a restriction valve 170 that selectively permits and restricts flow of pressurized liquid from outlet conduit 132 to bleed conduit 136. Additionally or alternatively, the restriction valve is adapted to selectively permit and selectively restrict flow of the bleed stream through the bleed conduit. By restrict, it is meant that the flow through the bleed conduit is at least selectively reduced, and may be selectively ceased altogether. Additionally or alternatively, the restriction valve may be adapted to permit flow of the bleed stream through the bleed conduit when pressure in the outlet conduit is less that the hydrogen-producing pressure range and is further adapted to restrict flow of the bleed stream through the bleed conduit when pressure in the outlet conduit is within or above the hydrogen-producing pressure range. Additionally or alternatively, the restriction valve may be adapted to permit flow of the bleed stream through the bleed conduit when the pump assembly does not emit the liquid outlet stream within or above the hydrogen-producing pressure range and further adapted to restrict flow of the bleed stream through the bleed conduit when the pump assembly emits the liquid outlet stream within or above the hydrogen-producing pressure range.

As indicated in dashed lines in FIG. 4, it is within the scope of the present disclosure (but not required to all embodiments) that restriction valve 170 may be utilized in place of bleed orifice 138 or may be used in series with bleed orifice 138. When used in series with bleed orifice 138, the restriction valve may be selectively positioned upstream or downstream from the bleed orifice without departing from the scope of the present disclosure. The relative position of orifice 138 and restriction valve 170, when present, may vary from the illustrative positions shown in FIGS. 2-4 without departing from the scope of the present disclosure so long as the flow-regulating aspect of the orifice and/or valve is maintained. As indicated in a dash-dot line in FIG. 4, it is further within the scope of the present disclosure that a pressure-relief valve, or other suitable pressure regulator, 156 may be (but is not required to be) utilized in place of bleed orifice 138.

When utilized, the restriction valve may be controlled to open and close via any suitable mechanism. In some embodiments, the restriction valve may be controlled to be open when a pump of a pump assembly is in its refill stroke and closed at least slightly after the pump begins its discharge stroke, if not closed before or when the discharge stroke begins. Accordingly, the restriction valve may be operatively linked to the pump assembly. Restriction valve 170 may be controlled by one or more of a variety of mechanisms. Illustrative, non-exclusive examples of such mechanisms include mechanical, electrical, and pressure-driven control mechanisms. Additional examples include controlling the restriction valve responsive to an encoder for the motor or other drive assembly for the motor, responsive to the position of the working portion of the pump, etc. A potential benefit of the stall prevention mechanism of FIG. 4 is that the flow of liquid through bleed conduit 136 may be prevented during the pump's pressurization cycle. However, the expense of the restriction valve and its control requirements are also a factor to be considered. An illustrative, non-exclusive example of a restriction valve that may be used in stall prevention mechanisms according to the present disclosure is a solenoid valve.

Figure 5:
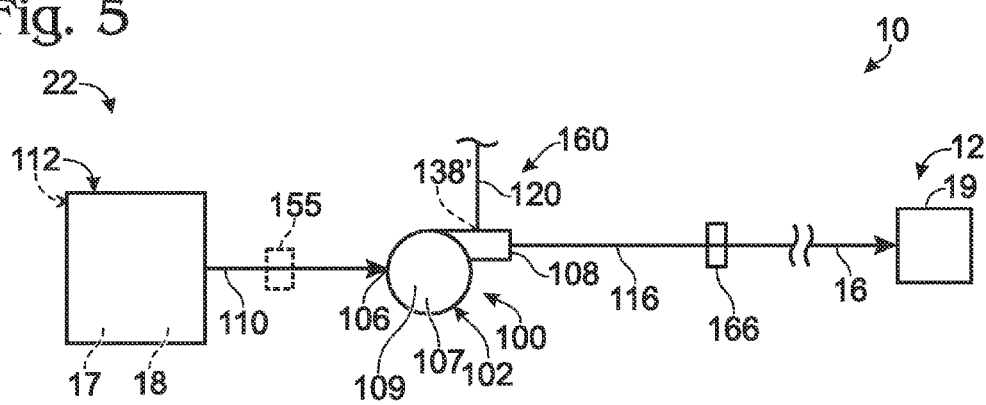
FIG. 5 is a schematic diagram of another feedstock delivery system according to the present disclosure.

Another illustrative, non-exclusive example of a feedstock delivery system 22 with a stall prevention mechanism 160 according to the present disclosure is shown in FIG. 5. The example shown in FIG. 5 may be utilized with any of the other components, variants, and subelements, of the feedstock delivery systems, fuel processing assemblies, and fuel cell systems otherwise described, illustrated, and/or incorporated herein without departing from the scope of the present disclosure. In FIG. 5, stall prevention mechanism 160 includes a bleed orifice 138' that is integrated into pump assembly 100. In this configuration, the pump assembly itself is designed such that the flow of liquid from a pump's internal fluid chamber 107 through the bleed orifice is automatically restricted and permitted responsive to movement of the pump's working portion 109 between the pressurization and refill cycles, respectively.

Figure 6:
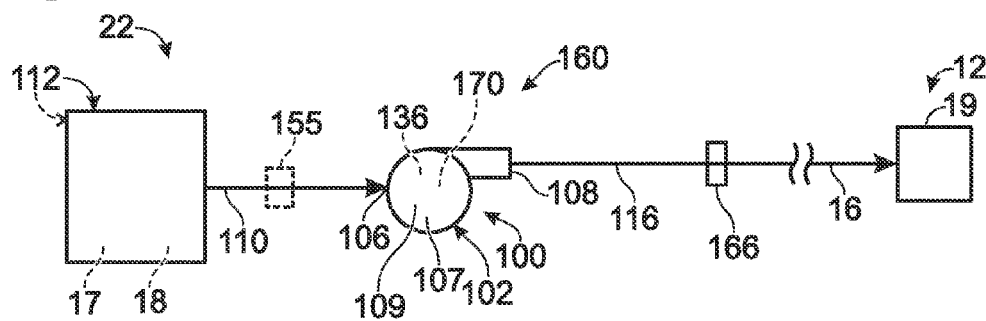
FIG. 6 is a schematic diagram of another feedstock delivery system according to the present disclosure.

Another illustrative, non-exclusive example of a feedstock delivery system 22 with a stall prevention mechanism 160 according to the present disclosure is shown in FIG. 6. The example shown in FIG. 6 may be utilized with any of the other components, variants, and subelements, of the feedstock delivery systems, fuel processing assemblies, and fuel cell systems otherwise described, illustrated, and/or incorporated herein without departing from the scope of the present disclosure. In FIG. 6, stall prevention mechanism 160 includes a bleed conduit 136 that is integral to the pump assembly 100. In this configuration, the pump assembly itself is designed such that a bleed stream is diverted from the liquid outlet stream prior to exiting the pump assembly and routed directly back to the internal chamber 107 of a pump 102, for example, during the refill stroke of the pump. In some such embodiments, the pump assembly may further include a restriction valve 170, as schematically illustrated in FIG. 6.

An illustrative, non-exclusive example of a method according to the present disclosure for delivering feedstock within a hydrogen-producing pressure range to a hydrogen-producing region of a hydrogen-producing fuel processing assembly that is adapted to produce a mixed gas stream containing hydrogen gas as a majority component therefrom may include one or more of the following: (i) drawing a liquid stream from a liquid supply containing at least one carbon-containing feedstock; (ii) pumping the liquid stream at least intermittently within or above the hydrogen-producing pressure range into an outlet conduit; (iii) delivering a delivery stream comprising at least a portion of the liquid stream from the outlet conduit to the hydrogen-producing region; (iv) isolating pressure in the outlet conduit from pressure in the hydrogen-producing region during periods in which the liquid stream is not being pumped within or above the hydrogen-producing pressure range; and (v) reducing pressure in the outlet conduit during periods in which the liquid stream is not being pumped within or above the hydrogen-producing pressure range.

Additionally or alternatively, the reducing pressure in the outlet conduit may include diverting a bleed stream comprising at least a portion of the liquid stream from the outlet conduit through a bleed conduit during periods in which the liquid stream is not being pumped within or above the hydrogen-producing pressure range.

Additionally or alternatively, a method according to the present disclosure may further include delivering the bleed stream to at least one of the liquid supply, the liquid stream upstream of the outlet conduit, and a burner associated with the hydrogen-producing fuel processing assembly.

Additionally or alternatively, a method according to the present disclosure may further include restricting flow of the bleed stream through the bleed conduit during periods in which the liquid stream is being pumped within or above the hydrogen-producing pressure range.

Additionally or alternatively, a method according to the present disclosure may further include restricting flow of the bleed stream through the bleed conduit during periods in which pressure in the outlet conduit is within or above the hydrogen-producing pressure range.

Additionally or alternatively, the pumping the liquid stream may be facilitated by a pump assembly including a positive displacement pump having an internal chamber and that is adapted to receive the liquid stream into the internal chamber during a refill stroke and to discharge the delivery stream from the internal chamber to the outlet conduit within or above the hydrogen-producing pressure range during a discharge stroke.

Additionally or alternatively, a method according to the present disclosure may further include delivering the bleed stream to the internal chamber of the positive displacement pump during the refill stroke of the positive displacement pump.

In many applications, it is desirable for fuel processor 12 and/or fuel processing assembly 10 to produce a product hydrogen stream 14 containing at least substantially pure hydrogen gas. Accordingly, the fuel processor may utilize a process that inherently produces sufficiently pure hydrogen gas. When the output stream contains sufficiently pure hydrogen gas and/or sufficiently low concentrations of one or more non-hydrogen components for a particular application, product hydrogen stream 14 may be formed directly from output stream 20. However, in many hydrogen-producing processes, output stream 20 will be a mixed gas stream that contains hydrogen gas as a majority component along with other gases. Similarly, in many applications, the output stream 20 may be substantially pure hydrogen but still contain concentrations of one or more non-hydrogen components that are harmful or otherwise undesirable in the application for which the product hydrogen stream is intended to be used.

Accordingly, fuel processing assembly 10 may (but is not required to) further include a purification region 24, in which a hydrogen-rich stream 26 is produced from the output, or mixed gas, stream. Hydrogen-rich stream 26 contains at least one of a greater hydrogen concentration than output stream 20 and a reduced concentration of one or more of the other gases or impurities that were present in the output stream. Purification region 24 is schematically illustrated in FIG. 1, where output stream 20 is shown being delivered to an optional purification region 24. As shown in FIG. 1, at least a portion of hydrogen-rich stream 26 forms product hydrogen stream 14. Accordingly, hydrogen-rich stream 26 and product hydrogen stream 14 may be the same stream and have the same compositions and flow rates. However, it is also within the scope of the present disclosure that some of the purified hydrogen gas in hydrogen-rich stream 26 may be stored for later use, such as in a suitable hydrogen storage assembly, subjected to a further purification process, and/or consumed by the fuel processing assembly (such as for use as a fuel stream for a heating assembly).

Purification region 24 may, but is not required to, produce at least one byproduct stream 28. When present, byproduct stream 28 may be exhausted, sent to a burner assembly or other combustion source, used as a heated fluid stream, stored for later use, or otherwise utilized, stored or disposed of. It is within the scope of the disclosure that byproduct stream 28 may be emitted from the purification region as a continuous stream responsive to the delivery of output stream 20 to the purification region, or intermittently, such as in a batch process or when the byproduct portion of the output stream is retained at least temporarily in the purification region. When purification region 24 produces a byproduct stream 28, the purification region may additionally or alternatively be referred to as a separation region, as the region separates the (mixed gas) output stream 20 into hydrogen-rich stream 26 and byproduct stream 28.

Purification region 24 includes any suitable device, or combination of devices, that are adapted to reduce the concentration of at least one component of output stream 20. In most applications, hydrogen-rich stream 26 will have a greater hydrogen concentration than output, or mixed gas, stream 20. However, it is also within the scope of the disclosure that the hydrogen-rich stream will have a reduced concentration of one or more non-hydrogen components that were present in output stream 20, yet have the same, or even a reduced, overall hydrogen concentration as the output stream. For example, in some applications where product hydrogen stream 14 may be used, certain impurities, or non-hydrogen components, are more harmful than others. As a specific example, in many conventional fuel cell systems (such as proton exchange membrane fuel cell systems), carbon monoxide may damage a fuel cell stack if it is present in even a few parts per million, while other non-hydrogen components that may be present in output stream 20, such as water, will not damage the stack even if present in much greater concentrations. Therefore, in such an application, a suitable purification region may not increase the overall hydrogen concentration, but it will reduce the concentration of a non-hydrogen component that is harmful, or potentially harmful, to the desired application for the product hydrogen stream.

Illustrative, non-exclusive examples of suitable devices for purification region 24 include one or more hydrogen-selective membranes 30, chemical carbon monoxide removal assemblies 32, and pressure swing adsorption systems 38. It is within the scope of the disclosure that purification region 24 may include more than one type of purification device, and that these devices may have the same or different structures and/or operate by the same or different mechanisms. As discussed, hydrogen-producing fuel processing assembly 10 may include at least one restrictive orifice or other flow restrictor downstream of at least one purification region, such as associated with one or more of the product hydrogen stream, hydrogen-rich stream, and/or byproduct stream.

Hydrogen-selective membranes 30 are permeable to hydrogen gas, but are at least substantially, if not completely, impermeable to other components of output stream 20. Membranes 30 may be formed of any hydrogen-permeable material suitable for use in the operating environment and parameters in which purification region 24 is operated. Examples of suitable materials for membranes 30 include palladium and palladium alloys, and especially thin films of such metals and metal alloys. Palladium alloys have proven particularly effective, especially palladium with 35 wt % to 45 wt % copper. A palladium-copper alloy that contains approximately 40 wt % copper has proven particularly effective, although other relative concentrations and components may be used within the scope of the disclosure.

Hydrogen-selective membranes are typically very thin, such as a thin foil that is approximately 0.001 inches thick. It is within the scope of the present disclosure, however, that the membranes may be formed from other hydrogen-permeable and/or hydrogen-selective materials, including metals and metal alloys other than those discussed above as well as non-metallic materials and compositions, and that the membranes may have thicknesses that are greater or less than discussed above. For example, the membrane may be made thinner, with commensurate increase in hydrogen flux. Examples of suitable mechanisms for reducing the thickness of the membranes include rolling, sputtering and etching. Examples of various membranes, membrane configurations, and methods for preparing the same are disclosed in U.S. Pat. Nos. 6,221,117, 6,319,306, and 6,537,352, the complete disclosures of which are hereby incorporated by reference for all purposes.

Chemical carbon monoxide removal assemblies 32 are devices that chemically react carbon monoxide and/or other undesirable components of output stream 20, if present in output stream 20, to form other compositions that are not as potentially harmful. Examples of chemical carbon monoxide removal assemblies include water-gas shift reactors and other devices that convert carbon monoxide to carbon dioxide, and methanation catalyst beds that convert carbon monoxide and hydrogen to methane and water. It is within the scope of the disclosure that fuel processing assembly 10 may include more than one type and/or number of chemical removal assemblies 32.

Pressure swing adsorption (PSA) is a chemical process in which gaseous impurities are removed from output stream 20 based on the principle that certain gases, under the proper conditions of temperature and pressure, will be adsorbed onto an adsorbent material more strongly than other gases. Typically, it is the impurities that are adsorbed and removed from output stream 20. The success of using PSA for hydrogen purification is due to the relatively strong adsorption of common impurity gases (such as CO, $CO_2$, hydrocarbons including $CH_4$, and $N_2$) on the adsorbent material. Hydrogen adsorbs only very weakly and so hydrogen passes through the adsorbent bed while the impurities are retained on the adsorbent material. Impurity gases such as $NH_3$, $H_2S$, and $H_2O$ adsorb very strongly on the adsorbent material and are removed from output stream 20 along with other impurities. If the adsorbent material is going to be regenerated and these impurities are present in output stream 20, purification region 24 preferably includes a suitable device that is adapted to remove these impurities prior to delivery of output stream 20 to the adsorbent material because it is more difficult to desorb these impurities.

Adsorption of impurity gases occurs at elevated pressure. When the pressure is reduced, the impurities are desorbed from the adsorbent material, thus regenerating the adsorbent material. Typically, PSA is a cyclic process and requires at least two beds for continuous (as opposed to batch) operation. Examples of suitable adsorbent materials that may be used in adsorbent beds are activated carbon and zeolites, especially 5 Å (5 angstrom) zeolites. The adsorbent material is commonly in the form of pellets and it is placed in a cylindrical pressure vessel utilizing a conventional packed-bed configuration. Other suitable adsorbent material compositions, forms, and configurations may be used.

PSA system 38 also provides an example of a device for use in purification region 24 in which the byproducts, or removed components, are not directly exhausted from the region as a gas stream concurrently with the purification of the output stream. Instead, these byproduct components are removed when the adsorbent material is regenerated or otherwise removed from the purification region.

In FIG. 1, purification region 24 is shown within fuel processor 12. It is within the scope of the disclosure that region 24, when present, may alternatively be separately located downstream from the fuel processor, as is schematically illustrated in dash-dot lines in FIG. 1. It is also within the scope of the disclosure that purification region 24 may include portions within and external fuel processor 12.

In the context of a fuel processor, or fuel processing assembly, that is adapted to produce a product hydrogen stream that will be used as a feed, or fuel, stream for a fuel cell stack, the fuel processor may be adapted to produce substantially pure hydrogen gas, or even pure hydrogen gas. For the purposes of the present disclosure, substantially pure hydrogen gas refers to hydrogen gas that is greater than 90% pure, and which may be greater than 95% pure, greater than 99% pure, and even greater than 99.5% pure. Suitable fuel processors and fuel processing assemblies, including illustrative (non-exclusive) examples of components and configurations therefor for producing streams of at least substantially pure hydrogen gas are disclosed in U.S. Pat. Nos. 6,319,306, 6,221,117, 5,997,594, 5,861,137, and pending U.S. Patent Publication Nos. 2001/0045061, 2003/0192251, 2003/0223926, 2006/0090397, and 2007/0062116. The complete disclosures of the above-identified patents and patent application publications are hereby incorporated by reference.

In FIG. 1, fuel processor 12 is shown including a shell 68 in which at least the hydrogen-producing region, and optionally the purification region, is contained. Shell 68, which also may be referred to as a housing, enables the components of the steam reformer or other fuel processing mechanism to be moved as a unit. It also protects the components of fuel processor 12 from damage by providing a protective enclosure and reduces the heating demand of the fuel processing assembly because the components of the fuel processor may be heated as a unit. Shell 68 may, but does not necessarily, include insulating material 70, such as a solid insulating material, blanket insulating material, and/or an air-filled cavity. It is within the scope of the disclosure, however, that the fuel processor may be formed without a housing or shell. When fuel processor 12 includes insulating material 70, the insulating material may be internal the shell, external the shell, or both. When the insulating material is external a shell containing the above-described reforming and/or purification regions, fuel processor 12 further may include an outer cover, or jacket, 72 external the insulation, as schematically illustrated in FIG. 1. It is within the scope of the present disclosure that the fuel processing assembly may be implemented with a different shell, with a shell that includes additional components of the fuel processing assembly, including feedstock delivery system 22 (or portions thereof, and/or includes additional components of the fuel cell system. It is also within the scope of the present disclosure that a fuel processing assembly 10 may not include a shell 68.

Figure 8:
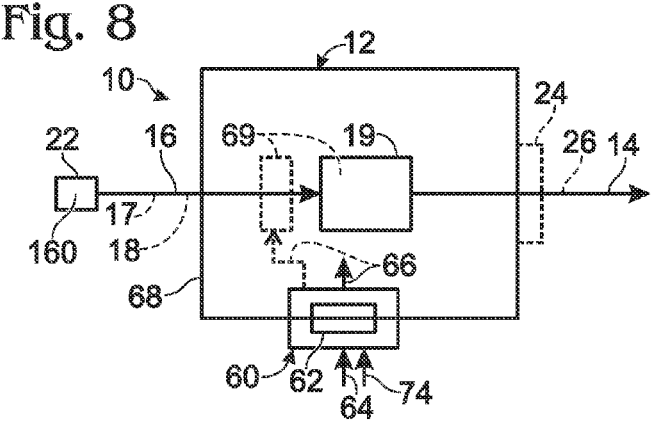
FIG. 8 is a schematic diagram of another fuel processing assembly with a feedstock delivery system according to the present disclosure.

It is further within the scope of the disclosure that one or more of the components of fuel processing assembly 10 may either extend beyond the shell or be located external at least shell 68. For example, and as previously discussed, purification region 24 may be located external shell 68, such as with the purification region being coupled directly to the shell (as schematically illustrated in FIG. 8) or being spaced-away from the shell but in fluid communication therewith by suitable fluid-transfer conduits (as indicated in dash-dot lines in FIG. 1). As another example, a portion of hydrogen-producing region 19 (such as portions of one or more reforming catalyst beds) may extend beyond the shell, such as indicated schematically with a dashed line representing an alternative shell configuration in FIG. 1.

As also shown in at least FIGS. 1 and 7-9, fuel processing assemblies (and fuel cell systems) according to the present disclosure may include a heating assembly 60 that is adapted to heat at least the hydrogen-producing region, or reforming region, 19 of the fuel processor. In some fuel processing assemblies according to the present disclosure, heating assembly 60 includes a burner assembly 62 and may be referred to as a combustion-based, or combustion-driven, heating assembly. In a combustion-based heating assembly, the heating assembly 60 is adapted to receive at least one fuel stream 64 and to combust the fuel stream in the presence of air to provide a hot combustion stream 66 that may be used to heat at least the hydrogen-producing region 19 of the fuel processor. Stream 66 may also be referred to as a heated exhaust stream. As discussed in more detail herein, air may be delivered to the heating assembly via a variety of mechanisms. In FIG. 8, an air stream 74 is shown in solid lines; however, it is within the scope of the disclosure for the air stream to additionally or alternatively be delivered to the heating assembly with at least one of the fuel streams 64 for the heating assembly 60 and/or drawn from the environment within which the heating assembly is utilized.

It is within the scope of the disclosure that combustion stream 66 may additionally or alternatively be used to heat other portions of the fuel processing assembly and/or fuel cell systems with which heating assembly 60 is used. It is also within the scope of the present disclosure that other configurations and types of heating assemblies 60 may be utilized. As an illustrative example, a heating assembly 60 may be an electrically powered heating assembly that is adapted to heat at least the hydrogen-producing region of the fuel processing assembly by generating heat using at least one heating element, such as a resistive heating element. Therefore, it is not required that heating assembly 60 receive and combust a combustible fuel stream to heat hydrogen-producing region 19 to a suitable hydrogen-producing temperature.

In FIGS. 1 and 7-9, heating assembly 60 is shown in an overlapping relationship with fuel processor 12 to graphically represent that it is within the scope of the disclosure that the heating assembly may be located partially or completely within fuel processor 12, such as being at least partially within shell 68, and/or that at least a portion, or all, of the heating assembly may be located external the fuel processor. In this latter embodiment, the hot combustion gases from the burner assembly will be delivered via suitable heat transfer conduits to the fuel processor or other portion of the system(s) to be heated. Illustrative, non-exclusive examples of suitable heating assemblies for use with fuel processing assemblies according to the present disclosure are disclosed in U.S. Patent Application Publication Nos. 2003/0192251, 2003/0223926, and 2006/0272212, the complete disclosures of which are hereby incorporated by reference.

As indicated in dashed lines in FIG. 8, fuel processors 12 and/or fuel processing assemblies 10 according to the present disclosure may include a vaporization region 69 that is adapted to receive a liquid feed stream 16 (or a liquid component of feed stream 16, such as a stream of water 17 or a stream of a liquid carbon-containing feedstock 18) and to vaporize the feed stream (or portion thereof prior to delivery to hydrogen-producing region 19 of fuel processor 12. As indicated schematically in FIG. 8, heated combustion stream 66 from the heating assembly may be used to vaporize the feed stream in vaporization region 69 and/or otherwise heat the feed stream. It is within the scope of the disclosure that fuel processor 12 may be constructed without a vaporization region and/or that the fuel processor is adapted to receive a feed stream that is gaseous or that has already been vaporized. It is also within the scope of the present disclosure that vaporization region 69, when present, extends partially or completely outside of shell 68 (when present).

Fuel processors 12, heating assemblies 60, and feedstock delivery systems 22 according to the present disclosure may be configured in any of the arrangements described, illustrated, and/or incorporated herein. In some embodiments, features or aspects from one or more of the above described configurations may be combined with each other and/or with additional features described herein. For example, it is within the scope of the present disclosure that fuel processing assemblies 10 that include at least one purification region 24 may (but are not required to) house the hydrogen-producing region 19 and at least a portion of the purification region together in a common housing, with this housing optionally being located within the shell 68 of the fuel processor. This is schematically illustrated in FIG. 9, in which reference numeral 25 generally indicates a hydrogen-producing region 19 of a fuel processor, with the hydrogen-producing region being contained within a housing, or vessel, 27 that contains at least the reforming (or other) catalyst 23 used to produce the mixed gas stream from the feed stream that is delivered to the hydrogen-producing region.

Figure 9:
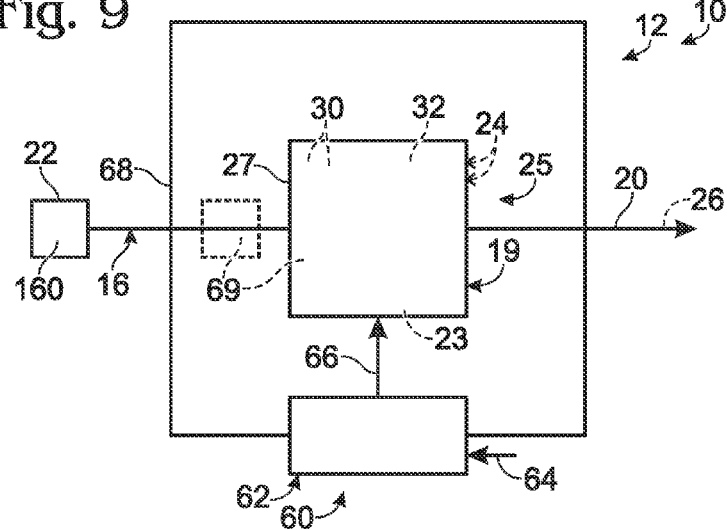
FIG. 9 is a schematic view of another example of a fuel processing assembly that may be used with feedstock delivery systems according to the present disclosure.

As indicated in dashed lines in FIG. 9, shell 27 (and thereby region 25) may, but is not required to, also include a purification region 24. For example, as illustrated in dashed lines in FIG. 9, the purification region, when present in the housing, may include one or more hydrogen-selective membranes 30 and/or a chemical carbon monoxide removal assembly 32. Accordingly, region 25 may be described as a hydrogen-producing and purifying region when it contains both a hydrogen-producing region 19 and a purification region 24. It is within the scope of the disclosure that any of the regions 19 and 24 described, illustrated, and/or incorporated herein may be used in region 25. When region 25 does not include a purification region, it may simply be described as a hydrogen-producing region 19 that includes a housing 27. When housing 27 includes a purification region 24, it is still within the scope of the present disclosure that the fuel processing assembly may include one or more additional purification regions (such as which may include the same or different purification devices/mechanisms) external (i.e., downstream from) housing 27. The fuel processing assemblies illustrated herein thereby include a hydrogen-producing region that is contained in a housing, with this housing optionally also containing a purification region. As also illustrated in FIG. 9, it is within the scope of the present disclosure that vaporization region 69, when present, may extend partially or completely within housing 27.

Figure 7:
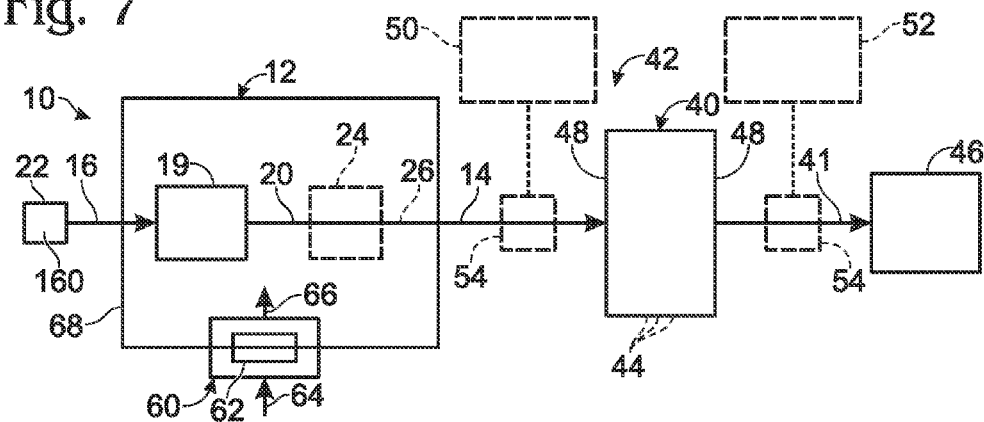
FIG. 7 is a schematic diagram of a fuel cell system with a feedstock delivery system according to the present disclosure.

As discussed, product hydrogen stream 14 may be used in a variety of applications, including applications where high purity hydrogen gas is utilized. An example of such an application is as a fuel, or feed, stream for a fuel cell stack. A fuel cell stack is a device that produces an electrical potential from a source of protons, such as hydrogen gas, and an oxidant, such as oxygen gas. Accordingly, a fuel cell stack may be adapted to receive at least a portion of product hydrogen stream 14 and a stream of oxygen (which is typically delivered as an air stream), and to produce an electric current therefrom. This is schematically illustrated in FIG. 7, in which a fuel cell stack is indicated at 40 and produces an electric current, which is schematically illustrated at 41. In such a configuration, in which the fuel processor or fuel processing assembly is coupled to a fuel cell stack, the resulting system may be referred to as a fuel cell system 42 because it includes a fuel cell stack and a source of fuel for the fuel cell stack. It is within the scope of the present disclosure that fuel processors, feedstock delivery systems, and heating assemblies according to the present disclosure may be used in applications that do not include a fuel cell stack.

When product hydrogen stream 14 is intended for use in a fuel cell stack, compositions that may damage the fuel cell stack, such as carbon monoxide and carbon dioxide, may be removed from the hydrogen-rich stream, if necessary, such as by purification region 24. For fuel cell stacks, such as proton exchange membrane (PEM) and alkaline fuel cell stacks, it may be desirable for the concentration of carbon monoxide to be less than 10 ppm (parts per million), less than 5 ppm, or even less than 1 ppm. The concentration of carbon dioxide may be greater than that of carbon monoxide. For example, concentrations of less than 25% carbon dioxide may be acceptable in some embodiments, with additional illustrative, non-exclusive examples including concentrations of less than 10%, less than 1%, or even less than 50 ppm. The acceptable minimum concentrations presented herein are illustrative examples, and concentrations other than those presented herein may be used and are within the scope of the present disclosure. For example, particular users or manufacturers may require minimum or maximum concentration levels or ranges that are different than those identified herein.

Fuel cell stack 40 contains at least one, and typically multiple, fuel cells 44 that are adapted to produce an electric current from an oxidant, such as air, oxygen-enriched air, or oxygen gas, and the portion of the product hydrogen stream 14 delivered thereto. A fuel cell stack typically includes multiple fuel cells joined together between common end plates 48, which contain fluid delivery/removal conduits, although this construction is not required to all embodiments. Examples of suitable fuel cells include proton exchange membrane (PEM) fuel cells and alkaline fuel cells. Others include solid oxide fuel cells, phosphoric acid fuel cells, and molten carbonate fuel cells.

The electric current, or electrical output, produced by fuel cell stack 40 may be used to satisfy the energy demands, or applied load, of at least one associated energy-consuming device 46. Illustrative examples of devices 46 include, but should not be limited to, motor vehicles, recreational vehicles, construction or industrial vehicles, boats or other seacraft, tools, lights or lighting assemblies, appliances (such as household or other appliances), households or other dwellings, offices or other commercial establishments, computers, signaling or communication equipment, battery chargers, etc. Similarly, fuel cell stack 40 may be used to satisfy the power requirements of fuel cell system 42, which may be referred to as the balance-of-plant power requirements of the fuel cell system. It should be understood that device 46 is schematically illustrated in FIG. 7 and is meant to represent one or more devices, or collection of devices, that are adapted to draw electric current from the fuel cell system.

Fuel cell stack 40 may receive all of product hydrogen stream 14. Some or all of stream 14 may additionally, or alternatively, be delivered, via a suitable conduit, for use in another hydrogen-consuming process, burned for fuel or heat, or stored for later use. As an illustrative example, a hydrogen storage device 50 is shown in dashed lines in FIG. 7. Fuel processing and/or fuel cell systems according to the present disclosure may, but are not required to, include at least one hydrogen storage device. Device 50 is adapted to store at least a portion of product hydrogen stream 14. For example, when the demand for hydrogen gas by fuel cell stack 40 is less than the hydrogen output of fuel processor 12, the excess hydrogen gas may be stored in device 50. Illustrative examples of suitable hydrogen storage devices include hydride beds and pressurized tanks. Although not required, a benefit of fuel processing assembly 10 or fuel cell system 42 including a supply of stored hydrogen is that this supply may be used to satisfy the hydrogen requirements of fuel cell stack 40, or the other application for which stream 14 is used, in situations when fuel processor 12 is not able to meet these hydrogen demands. Examples of these situations include when the fuel processor is starting up from a cold, or inactive state, ramping up (being heated and/or pressurized) from an idle state, offline for maintenance or repair, and when the fuel cell stack or application is demanding a greater flow rate of hydrogen gas than the maximum available production from the fuel processor. Additionally or alternatively, the stored hydrogen may also be used as a combustible fuel stream to heat the fuel processing assembly or fuel cell system. Fuel processing assemblies that are not directly associated with a fuel cell stack may still include at least one hydrogen-storage device, thereby enabling the product hydrogen streams from these fuel processing assemblies to also be stored for later use.

Fuel cell system 42 may also include at least one battery 52 or other suitable energy-storage, or electricity-storing, device that is adapted to store the electric potential, or power output, produced by fuel cell stack 40. Illustrative, non-exclusive examples of other energy storage devices that may be used include flywheels and capacitors, such as ultracapacitors or supercapacitors. Similar to the above discussion regarding excess hydrogen, fuel cell stack 40 may produce a power output in excess of that necessary to satisfy the load exerted, or applied, by device 46, including the load required to power fuel cell system 42. In further similarity to the above discussion of excess hydrogen gas, this excess power output may be used in other applications outside of the fuel cell system and/or stored for later use by the fuel cell system. For example, the battery or other storage device may provide power for use by system 42 during startup or other applications in which the system is not producing electricity and/or hydrogen gas. In FIG. 7, flow-regulating structures are generally indicated at 54 and schematically represent any suitable manifolds, valves, controllers, switches and the like for selectively delivering hydrogen and the fuel cell stack's power output to device 50 and battery 52, respectively, and to draw the stored hydrogen and stored power output therefrom.

Figure 10:
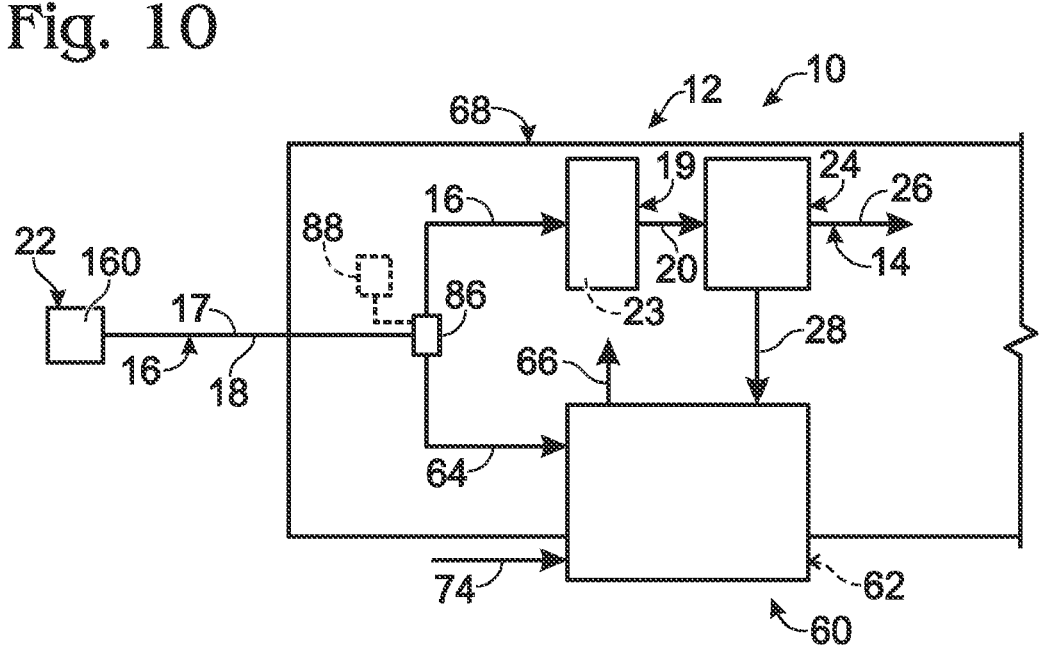
FIG. 10 is a schematic view of a fuel processing assembly according to the present disclosure in which the hydrogen-producing region and the heating assembly both receive fuel, or feed, streams containing water and a liquid carbon-containing feedstock.

FIG. 10 provides a graphical example of fuel processing assembly 10 that includes a feedstock delivery system 22 with a stall prevention mechanism 160 according to the present disclosure and in which the pressurized liquid outlet stream from the feedstock delivery system is selectively used as both a hydrogen-producing feed stream 16 for a hydrogen-producing region of a fuel processor 12 and as a combustible fuel stream 64 for a heating assembly 60, such as may take the form of a burner 62 that combusts this fuel stream with air from an air stream 74. In the example shown in FIG. 10, hydrogen-producing region 19 is shown including a reforming catalyst 23, with the mixed gas, or outlet, stream 20 from the hydrogen-producing region being delivered to a purification region 24. Purification region 24 separates the mixed gas stream into a hydrogen-rich stream 26, which may form at least a portion of product hydrogen stream 14, and a byproduct stream 28, which may be consumed as a gaseous fuel for heating assembly 60. Heating assembly 60 is shown producing a heated exhaust stream 66, which may be used to heat at least hydrogen-producing region 19 to a suitable hydrogen-producing temperature. As discussed, feedstock delivery system 22 also produces a feed stream 16 having a suitable hydrogen-producing pressure to pressurize the hydrogen-producing region, and optionally, purification region 24. FIG. 10 also illustrates an optional shell 68 for the fuel processor, an optional valve assembly 86 that may be used to apportion or otherwise direct the outlet stream from the feedstock delivery system to, or between, the hydrogen-producing region and the heating assembly and an optional controller 88 for the valve assembly.

Figure 11:
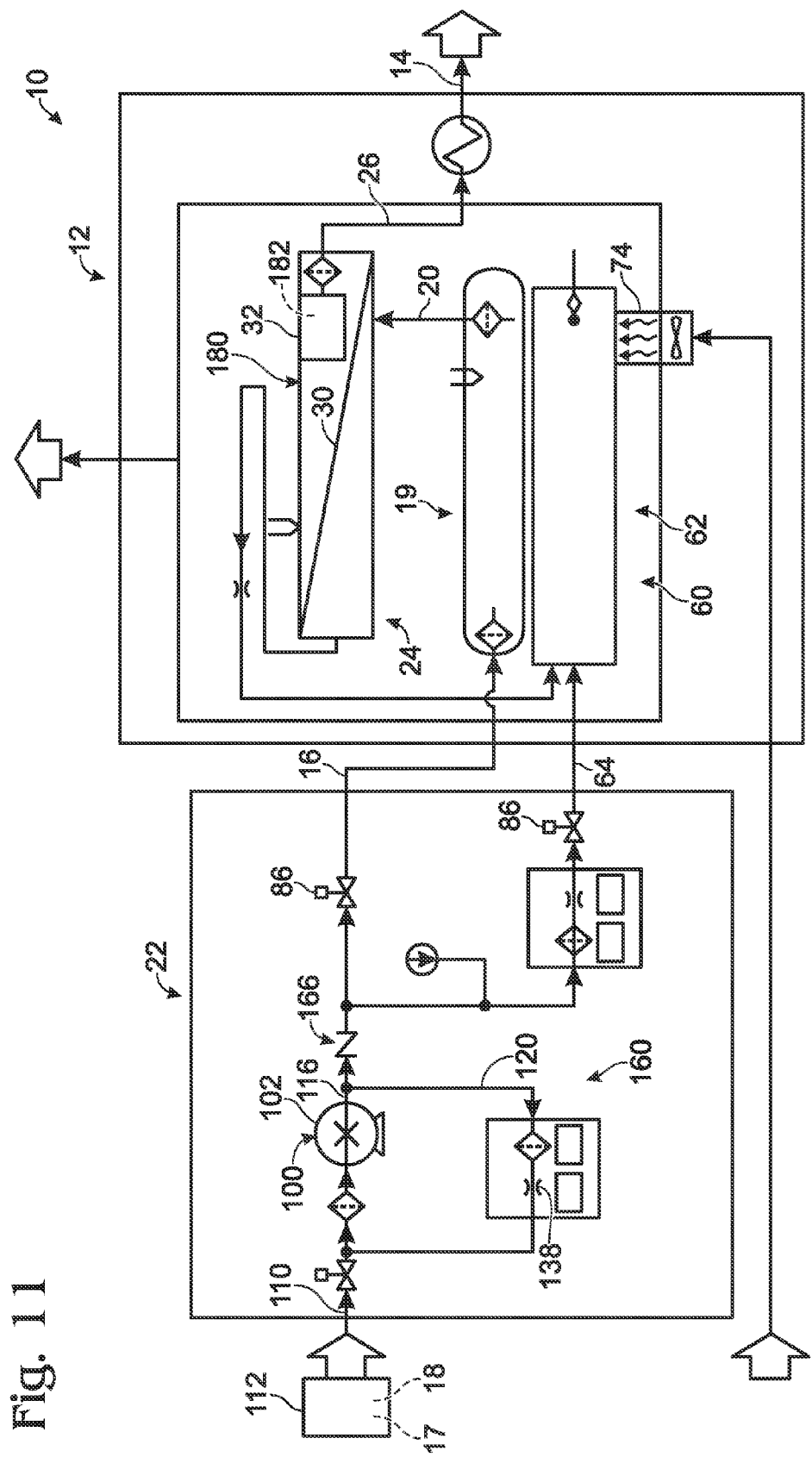
FIG. 11 is a schematic diagram of another fuel processing assembly with a feedstock delivery system according to the present disclosure.

A further illustrative, non-exclusive example of a fuel processing assembly 10 with a feedstock delivery system 22 with a stall prevention mechanism 160 according to the present disclosure is shown in FIG. 11. For the purpose of brevity, the previously discussed components that are graphically depicted in FIG. 11 are not discussed again. In FIG. 11, fuel processing assembly 10 is shown with a fuel processor 12 that includes a purification region 24 that includes both a membrane purification (or separation) region 180 containing at least one hydrogen-selective membrane 30 and a chemical carbon monoxide removal assembly 32, such as a methanation catalyst bed 182.

INDUSTRIAL APPLICABILITY

The feedstock delivery systems, and hydrogen-producing fuel processing and fuel cell systems containing the same that are disclosed herein are applicable to the hydrogen- and energy-production industries, including the fuel cell industries.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions, and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

The invention claimed is:

1. A hydrogen-producing fuel processing assembly, comprising:
    a hydrogen-producing region configured to receive at least a feed stream containing at least a carbon-containing feedstock and to produce a mixed gas stream containing hydrogen gas as a majority component therefrom, the hydrogen-producing region further configured to operate within a hydrogen-producing pressure range; and a feedstock delivery system configured to deliver at least a portion of the feed stream to the hydrogen-producing region, wherein the feedstock delivery system is in communication with a liquid supply containing at least the carbon-containing feedstock, wherein the feedstock delivery system includes:

a pump assembly configured to draw from the liquid supply a liquid inlet stream containing at least the carbon-containing feedstock and to emit a liquid outlet stream at least intermittently within or above the hydrogen-producing pressure range, the pump assembly having an inlet for receiving the liquid inlet stream and an outlet for emitting the liquid outlet stream;

an inlet conduit through which the liquid inlet stream is drawn to the pump assembly;

an outlet conduit through which the liquid outlet stream is emitted from the pump assembly;

a delivery conduit in fluid communication with the outlet conduit and the hydrogen-producing region and through which a delivery stream is delivered to the hydrogen-producing region; and a stall prevention mechanism, the stall prevention mechanism including:

a check valve positioned between the outlet conduit and the hydrogen-producing region and configured to isolate pressure in the outlet conduit from pressure in the hydrogen-producing region during periods in which the pump assembly is not emitting the liquid outlet stream within or above the hydrogen-producing pressure range; and a bleed conduit in fluid communication between the outlet conduit and at least one of the liquid supply, the inlet conduit, the pump assembly, and a burner associated with the hydrogen-producing fuel processing assembly, and through which a bleed stream at least intermittently flows;

wherein the stall prevention mechanism is configured to reduce pressure in the outlet conduit during periods in which the pump assembly is not emitting the liquid outlet stream within or above the hydrogen-producing pressure range and the hydrogen-producing region is producing the mixed gas stream from the feed stream;

wherein the pump assembly includes at least one positive displacement pump that is configured to receive the liquid inlet stream during a refill stroke and to emit the liquid outlet stream during a discharge stroke; and wherein the stall prevention mechanism is configured to restrict flow of the bleed stream through the bleed conduit during the discharge stroke of the positive displacement pump;

wherein the pump assembly includes at least one positive displacement pump that is configured to receive the liquid inlet stream during a refill stroke and to emit the liquid outlet stream during a discharge stroke; and wherein the stall prevention mechanism further includes a restriction valve operatively linked to the at least one positive displacement pump (i) to permit flow of the bleed stream through the bleed conduit during the at least one positive displacement pump's refill stroke, and (ii) to restrict flow of the bleed stream through the bleed conduit during the at least one positive displacement pump's discharge stroke.

2. The hydrogen-producing fuel processing assembly of claim 1, wherein at least a portion of the bleed conduit is sized, relative to the outlet conduit, to reduce pressure in the outlet conduit during periods in which the pump assembly is not emitting the liquid outlet stream within or above the hydrogen-producing pressure range and the hydrogen-producing region is producing the mixed gas stream from the feed stream.

3. The hydrogen-producing fuel processing assembly of claim 2, wherein the bleed conduit includes an orifice that is sized, relative to the outlet conduit, to reduce pressure in the outlet conduit during periods in which the pump assembly is not emitting the liquid outlet stream within or above the hydrogen-producing pressure range and the hydrogen-producing region is producing the mixed gas stream from the feed stream.

4. The hydrogen-producing fuel processing assembly of claim 1, wherein the restriction valve is configured to selectively permit and selectively restrict flow of the bleed stream through the bleed conduit.

5. The hydrogen-producing fuel processing assembly of claim 4, wherein the restriction valve is a solenoid valve.

6. The hydrogen-producing fuel processing assembly of claim 4, wherein the restriction valve is configured to permit flow of the bleed stream through the bleed conduit when pressure in the outlet conduit is less than the hydrogen-producing pressure range and the hydrogen-producing region is producing the mixed gas stream from the feed stream, and further wherein the restriction valve is configured to restrict flow of the bleed stream through the bleed conduit when pressure in the outlet conduit is within or above the hydrogen-producing pressure range and the hydrogen-producing region is producing the mixed gas stream from the feed stream.

7. The hydrogen-producing fuel processing assembly of claim 4, wherein the restriction valve is configured to permit flow of the bleed stream through the bleed conduit when the pump assembly does not emit the liquid outlet stream within or above the hydrogen-producing pressure range and the hydrogen-producing region is producing the mixed gas stream from the feed stream, and wherein the restriction valve is configured to restrict flow of the bleed stream through the bleed conduit when the pump assembly emits the liquid outlet stream within or above the hydrogen-producing pressure range and the hydrogen-producing region is producing the mixed gas stream from the feed stream.

8. The hydrogen-producing fuel processing assembly of claim 7, wherein the restriction valve is operatively linked to the pump assembly (i) to permit flow of the bleed stream through the bleed conduit when the pump assembly does not emit the liquid outlet stream within or above the hydrogen-producing pressure range and the hydrogen-producing region is producing the mixed gas stream from the feed stream, and (ii) to restrict flow of the bleed stream through the bleed conduit when the pump assembly emits the liquid outlet stream within or above the hydrogen-producing pressure range and the hydrogen-producing region is producing the mixed gas stream from the feed stream.

9. The hydrogen-producing fuel processing assembly of claim 1, wherein the at least one positive displacement pump has an internal chamber;

wherein the bleed conduit is in fluid communication between the outlet conduit and the internal chamber of the at least one positive displacement pump; and wherein the at least one positive displacement pump is configured to receive the liquid inlet stream and the bleed stream during the refill stroke and to emit the liquid outlet stream during the discharge stroke.

10. The hydrogen-producing fuel processing assembly of claim 1, wherein the bleed conduit is integral to the pump assembly, and further wherein the bleed conduit provides fluid communication between the outlet conduit and the pump assembly.

* * * * *

UNITED STATES PATENT AND TRADEMARK OFFICE
CERTIFICATE OF CORRECTION

| | |
|---|---|
| PATENT NO. | : 8,262,752 B2 |
| APPLICATION NO. | : 12/255063 |
| DATED | : September 11, 2012 |
| INVENTOR(S) | : Vernon Wade Popham |

It is certified that error appears in the above-identified patent and that said Letters Patent is hereby corrected as shown below:

On page 21, Column 23, Lines 51-59, please delete "wherein the stall prevention mechanism is configured to restrict flow of the bleed stream through the bleed conduit during the discharge stroke of the positive displacement pump;
wherein the pump assembly includes at least one positive displacement pump that is configured to receive the liquid inlet stream during a refill stroke and to emit the liquid outlet stream during a discharge stroke; and"

Signed and Sealed this

Twenty-seventh Day of November, 2012

David J. Kappos
*Director of the United States Patent and Trademark Office*